(12) United States Patent
Trujillo et al.

(10) Patent No.: US 8,808,572 B2
(45) Date of Patent: Aug. 19, 2014

(54) CITRATE CONTAINING DEICING COMPOSITIONS WITH IMPROVED EUTECTIC TEMPERATURES

(71) Applicant: Envirotech Services, Inc., Greeley, CO (US)

(72) Inventors: Joshua J. Trujillo, Greeley, CO (US); Stephen C. Bytnar, Greeley, CO (US); Mark Wolfe, Greeley, CO (US)

(73) Assignee: Envirotech Services, Inc., Greeley, CO (US)

( * ) Notice: Subject to any disclaimer, the term of this patent is extended or adjusted under 35 U.S.C. 154(b) by 0 days.

(21) Appl. No.: 13/670,659

(22) Filed: Nov. 7, 2012

(65) Prior Publication Data

US 2013/0306904 A1    Nov. 21, 2013

Related U.S. Application Data

(60) Provisional application No. 61/559,531, filed on Nov. 14, 2011.

(51) Int. Cl.
 *C09K 3/18* (2006.01)
(52) U.S. Cl.
 CPC ...................................... *C09K 3/185* (2013.01)
 USPC ............................................... 252/70; 106/13
(58) Field of Classification Search
 CPC .................................. C09K 3/18; C09K 3/185
 USPC ............................................... 252/70; 106/13
 See application file for complete search history.

(56) References Cited

U.S. PATENT DOCUMENTS

| 5,302,307 | A |  | 4/1994 | Ireland |  |
|---|---|---|---|---|---|
| 5,595,679 | A | * | 1/1997 | Zaid | ................. 252/70 |
| 6,468,442 | B2 |  | 10/2002 | Bytnar |  |
| 6,861,009 | B1 | * | 3/2005 | Leist | ................. 252/70 |
| 7,632,421 | B2 | * | 12/2009 | Bytnar | ................. 252/70 |
| 2006/0180786 | A1 |  | 8/2006 | Sapienza et al. |  |
| 2010/0230478 | A1 |  | 9/2010 | Ono |  |
| 2011/0163257 | A1 |  | 7/2011 | Sapienza et al. |  |

FOREIGN PATENT DOCUMENTS

| GB | 2362160 A | * | 11/2001 | ............... C09K 3/00 |
|---|---|---|---|---|
| JP | 2004182871 A | * | 7/2004 | ............... C09K 3/18 |

OTHER PUBLICATIONS

PCT/US12/64093 filed on Nov. 8, 2012, 36 pages.
U.S. Appl. No. 61/559,531, filed Nov. 14, 2011, 42 pages.
International Search Report and Written Opinion of PCT/US2012/064093 mailed on Jan. 25, 2013, 12 pages.

* cited by examiner

*Primary Examiner* — Anthony J Green
(74) *Attorney, Agent, or Firm* — Kilpatrick Townsend & Stockton LLP

(57) ABSTRACT

Deicing compositions are described for reducing an amount of ice formed on a surface. The deicing compositions may include about 1 wt. % to about 15 wt. % of a salt of citric acid. The compositions may further include about 23 wt. % to about 28 wt. % sodium chloride when the deicing composition forms an aqueous solution.

8 Claims, 26 Drawing Sheets

CITRATE CONTAINING DEICING COMPOSITIONS WITH IMPROVED EUTECTIC TEMPERATURES

CROSS-REFERENCE TO RELATED APPLICATIONS

This application is a non-provisional of and claims the benefit and priority of U.S. Application No. 61/559,531, filed on Nov. 14, 2011, which is hereby incorporated by reference in its entirety for all purposes.

FIELD OF THE INVENTION

De-Icing compositions are described for preventing the formation and reducing the buildup of ice on roads and other outdoor surfaces. More specifically, de-icing compositions with lowered eutectic temperatures are described.

BACKGROUND OF THE INVENTION

Salt (i.e., sodium chloride) has been used for many years to control the formation and accumulation of snow and ice on roads. The salt is typically pre-wetted or dissolved with water into an aqueous brine solution that is applied to the road surface using spinners and/or spray nozzles attached to snow plows and other snow/ice removal vehicles.

In brine solutions of sodium chloride dissolved in water, the brine becomes fully saturated when the salt concentration reaches about 23 wt. %. This lower the freezing point of the solution from 32° F. (0° C.) for pure water to −6° F. (−21° C.) for the fully saturated brine. During winter months in many northern regions, temperatures can fall below −6° F., reducing the effectiveness of sodium chloride brines in breaking up and preventing the formation of snow and ice on roads and bridges.

One approach to overcoming the low-temperature limits of sodium chloride brines is to also spread sand, gravel and other abrasives over the snow and ice to increase the coefficient of friction between the road and vehicle tires. Unfortunately, vehicle traffic tend to push these materials off the road surface quickly, requiring frequent reapplication. Also, vehicle tires can kick up these materials into car windshields and grilles, which can cause significant vehicle damage and even pose safety risks.

Thus, there is a desire for new de-icing and anti-icing compositions that can melt snow and ice at temperatures below the freezing point of a pure sodium chloride brine. This and other issues are addressed in the present application.

BRIEF SUMMARY OF THE INVENTION

Deicing compositions are described that add citrate compounds to alkali metal and/or alkali earth metal halide salts at concentrations that significantly lower the eutectic temperature of the composition. The eutectic temperature represents a temperature minima at which the deicing composition can melt water-ice. For example, the eutectic temperature for sodium chloride (NaCl) is about −6° F. (−21.1° C.). Because the process of melting ice dissolves and increasingly dilutes the deicing composition in an aqueous solution (sometimes called the "brine"), the eutectic temperature usually represents a global minima for a solid deicing composition. The freezing temperature of the diluting brine progressively increases towards the freezing point of pure water.

While the eutectic temperature may represent a theoretical minima that is not maintained for long as a deicing composition melts ice, it is often a good proxy for more practical melting temperatures, such as the melting temperature when the deicing composition is diluted with an equal weight of water (sometimes called the 1:1 dilution and/or the "50 Phase" melting temperature). The eutectic temperature may also be a good proxy for the rate at which the deicing composition begins to work converting ice into a brine. Thus, lowering the eutectic temperature of a deicing composition can have a number of advantageous effects on melt performance, particularly as the ice temperature falls further below the freezing point of water.

Embodiments of the invention may include deicing compositions to reduce an amount of ice formed on a surface. The compositions may include about 1 wt. % to about 15 wt. % of a citrate compound, and about 23 wt. % to about 28 wt. % of a alkali metal and/or alkali-earth metal halide salt when the deicing composition forms an aqueous solution.

The citrate compound may include citric acid and/or a salt of a citric acid compound. Examples may include salts that pair an alkali metal and/or alkali-earth metal cation with the up to three carboxylate ions that can form from deprotonating the three carboxylic acid groups of citric acid. For example, a salt of sodium citrate may be formed by replacing one, two, or three of the carboxylic acid protons with sodium ions (i.e., monosodium citrate, disodium citrate, and trisodium citrate). The citric acid and/or citrate salts may be added to the deicing composition as part of an aqueous solution, or as a solid. When added as solid, the citrate compound may be anhydrous, or more typically a hydrate that incorporates one or more water ("$H_2O$") group into the crystal structure of the compound. For example, solid sodium citrate may be incorporated one or more water groups into the crystal structure, such as sodium citrate monohydrate (i.e., $1H_2O$), sodium citrate dihydrate (i.e., $.2H_2O$), sodium citrate trihydrate (i.e., $3H_2O$), sodium citrate tetrahydrate (i.e., $.4H_2O$), sodium citrate pentahydrate (i.e., $5H_2O$), sodium citrate hexahydrate (i.e., $6H_2O$), etc. Citrate compounds may also include the hydrates and/or anhydrates of salts beyond sodium, such as other alkali metals (e.g., $Li^+$, $K^+$, etc.), alkali-earth metals (e.g., $Mg^{2+}$, $Ca^{2+}$, etc.), among other cations.

Examples of the alkali metal and/or alkali-earth metal halide salts may include sodium chloride (NaCl), potassium chloride (KCl), magnesium chloride ($MgCl_2$), and calcium chloride ($CaCl_2$), among other salts. These salts may be added individually or as a blend of two or more of the salts. It should be appreciated that even when a single salt is being described, the purity levels of the salt in a deicing composition may be such that detectable amounts of other salts are also present.

When the deicing composition is applied to ice and begins to melt, it forms an aqueous brine with the liquefying ice. The brine may initially have a concentration of about 1 wt. % to about 15 wt. % of the citrate compound, and about 23 wt. % to about 28 wt. % of the salt component. When the salt is sodium chloride, the 23 wt. % represents the rough saturation concentration of NaCl in water at its eutectic temperature. With the addition of the citrate compound (e.g., sodium citrate dehydrate "SCD", alternatively called tri sodium citrate), the solids concentration in solution may increase to about 28 wt. %, which helps further lower the eutectic temperature of the solution.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

EXPERIMENTAL

Figure 1:
FIG. 1 shows a Differential Scanning calorimetry (DSC) scan of an undiluted (100 Phase) 23 wt. % NaCl sample across a freezing point transition for the sample.

Differential Scanning calorimetry (DSC) measurements were taken to determine the melting/freezing points of aqueous samples with varying concentrations of a freezing point depressant. The freezing point depressants sampled here included (1) pure sodium chloride (NaCl) and (2) mixtures of sodium chloride and sodium citrate dihydrate (SCD). Comparative DSC measurements on pure water ice were also performed to establish a baseline for the efficacy of the freezing point depressants at lowering the melting/freezing points of ice. The DSC scans are shown in FIGS. 1-6, and the results of the DSC measurements are listed below in Tables 1-3.

TABLE 1

100 Phase DSC Measurements

| Sample | Time in Minutes | | | ° F. | | | Energy J/g |
| --- | --- | --- | --- | --- | --- | --- | --- |
| | Time 1 | Time 2 | Time 2 – Time 1 | Temp 1 | Temp 2 | Temp 2 – Temp 1 | |
| 23% NaCl | 76.58 | 80.20 | 3.62 | −5.53 | −0.45 | 5.08 | −231.4 |
| 23% NaCl + 1% SCD | 75.68 | 78.28 | 2.60 | −10.63 | −5.58 | 5.05 | −211.4 |
| 23% NaCl + 2% SCD | 75.53 | 78.03 | 2.50 | −11.53 | −6.49 | 5.04 | −201.3 |
| 23% NaCl + 3% SCD | 75.45 | 78.13 | 2.68 | −11.93 | −6.59 | 5.34 | −194.2 |
| 23% NaCl + 4% SCD | 75.35 | 77.98 | 2.63 | −12.46 | −6.77 | 5.69 | −183.8 |
| 23% NaCl + 5% SCD | 75.23 | 77.82 | 2.59 | −13.15 | −7.87 | 5.28 | −179.7 |
| 23% NaCl + 6% SCD | 75.30 | 77.79 | 2.49 | −12.74 | −7.36 | 5.38 | −153.5 |
| 23% NaCl + 7% SCD | 75.32 | 78.23 | 2.91 | −12.63 | −7.06 | 5.57 | −121.3 |
| 23% NaCl + 8% SCD | 74.86 | 77.57 | 2.71 | −15.18 | −9.01 | 6.17 | −166.8 |
| 23% NaCl + 9% SCD | 74.77 | 77.52 | 2.75 | −15.67 | −8.84 | 6.83 | −168.7 |
| 23% NaCl + 10% SCD | 74.96 | 77.82 | 2.86 | −14.56 | −8.64 | 5.92 | −160.7 |
| Difference between 23% NaCl and 23% NaCl + 10% SCD | 1.62 | 2.38 | 0.76 | 9.03 | 8.19 | −0.84 | |

TABLE 2

50 Phase DSC Measurements (Peak 1)

| Sample | Time in Minutes | | | ° F. | | | Energy J/g |
| --- | --- | --- | --- | --- | --- | --- | --- |
| | Time 1 | Time 2 | Time 2 – Time 1 | Temp 1 | Temp 2 | Temp 2 – Temp 1 | |
| 23% NaCl | 76.61 | 78.76 | 2.15 | −5.41 | −2.77 | 2.64 | 120.90 |
| 23% NaCl + 1% SCD | 75.70 | 77.86 | 2.16 | −10.32 | −6.35 | 3.97 | −96.40 |
| 23% NaCl + 2% SCD | 75.64 | 77.69 | 2.05 | −10.70 | −6.45 | 4.25 | −93.78 |
| 23% NaCl + 3% SCD | 75.58 | 77.71 | 2.13 | −11.01 | −6.72 | 4.29 | −89.09 |
| 23% NaCl + 4% SCD | 75.52 | 77.51 | 1.99 | −11.45 | −7.37 | 4.08 | −92.82 |
| 23% NaCl + 5% SCD | 75.38 | 77.23 | 1.85 | −12.17 | −7.73 | 4.44 | −86.39 |
| 23% NaCl + 6% SCD | 75.37 | 77.25 | 1.88 | −12.26 | −8.34 | 3.92 | −84.47 |
| 23% NaCl + 7% SCD | 75.02 | 76.61 | 1.59 | −13.88 | −9.76 | 4.12 | −31.95 |
| 23% NaCl + 8% SCD | 75.32 | 77.30 | 1.98 | −12.52 | −8.87 | 3.65 | −77.67 |
| 23% NaCl + 9% SCD | 75.14 | 77.39 | 2.25 | −13.41 | −8.15 | 5.26 | −69.29 |
| 23% NaCl + 10% SCD | 74.94 | 77.03 | 2.09 | −14.55 | −9.82 | 4.73 | −81.30 |
| Difference between 23% NaCl and 23% NaCl + 10% SCD | 1.67 | 1.73 | 0.06 | 9.14 | 7.05 | −2.09 | |

TABLE 3

50 Phase DSC Measurements (Peak 2)

| Sample | Time in Minutes | | | °F. | | | Energy J/g |
| --- | --- | --- | --- | --- | --- | --- | --- |
| | Time 1 | Time 2 | Time 2 − Time 1 | Temp 1 | Temp 2 | Temp 2 − Temp 1 | |
| 23% NaCl | 79.40 | 82.83 | 3.43 | 9.30 | 19.43 | 10.13 | 76.80 |
| 23% NaCl + 1% SCD | 78.73 | 82.25 | 3.52 | 5.82 | 15.91 | 10.09 | −63.67 |
| 23% NaCl + 2% SCD | 78.67 | 82.08 | 3.41 | 5.49 | 15.85 | 10.36 | −63.38 |
| 23% NaCl + 3% SCD | 78.72 | 81.71 | 2.99 | 5.74 | 15.76 | 10.02 | −63.23 |
| 23% NaCl + 4% SCD | 78.53 | 81.91 | 3.38 | 4.70 | 15.36 | 10.66 | −69.25 |
| 23% NaCl + 5% SCD | 78.51 | 81.90 | 3.39 | 4.59 | 15.04 | 10.45 | −69.41 |
| 23% NaCl + 6% SCD | 78.34 | 81.28 | 2.94 | 3.70 | 14.46 | 10.76 | −70.40 |
| 23% NaCl + 7% SCD | 78.16 | 80.67 | 2.51 | 3.04 | 12.98 | 9.94 | −32.30 |
| 23% NaCl + 8% SCD | 78.21 | 81.52 | 3.31 | 3.04 | 13.9 | 10.86 | −70.22 |
| 23% NaCl + 9% SCD | 78.07 | 81.61 | 3.54 | 2.32 | 13.34 | 11.02 | −60.04 |
| 23% NaCl + 10% SCD | 77.95 | 81.70 | 3.75 | 1.67 | 14.36 | 12.69 | −76.50 |
| Difference between 23% NaCl and 23% NaCl + 10% SCD | 1.45 | 1.13 | −0.32 | 7.63 | 5.07 | −2.56 | |

Referring now to FIG. 1, a DSC scan is shown for an undiluted (100 Phase) 23 wt. % NaCl sample in ice across a freezing point transition for the ice. The scan shows a single peak with a first heat flow inflection point at around −5.53° F. and a second heat flow inflection point at around −0.45° F. The first heat flow inflection point represents the melting/freezing point of the sample (the temperature at which the sample will start melting), and the second heat flow inflection point represents the temperature at which the sample has completely melted.

Figure 2:
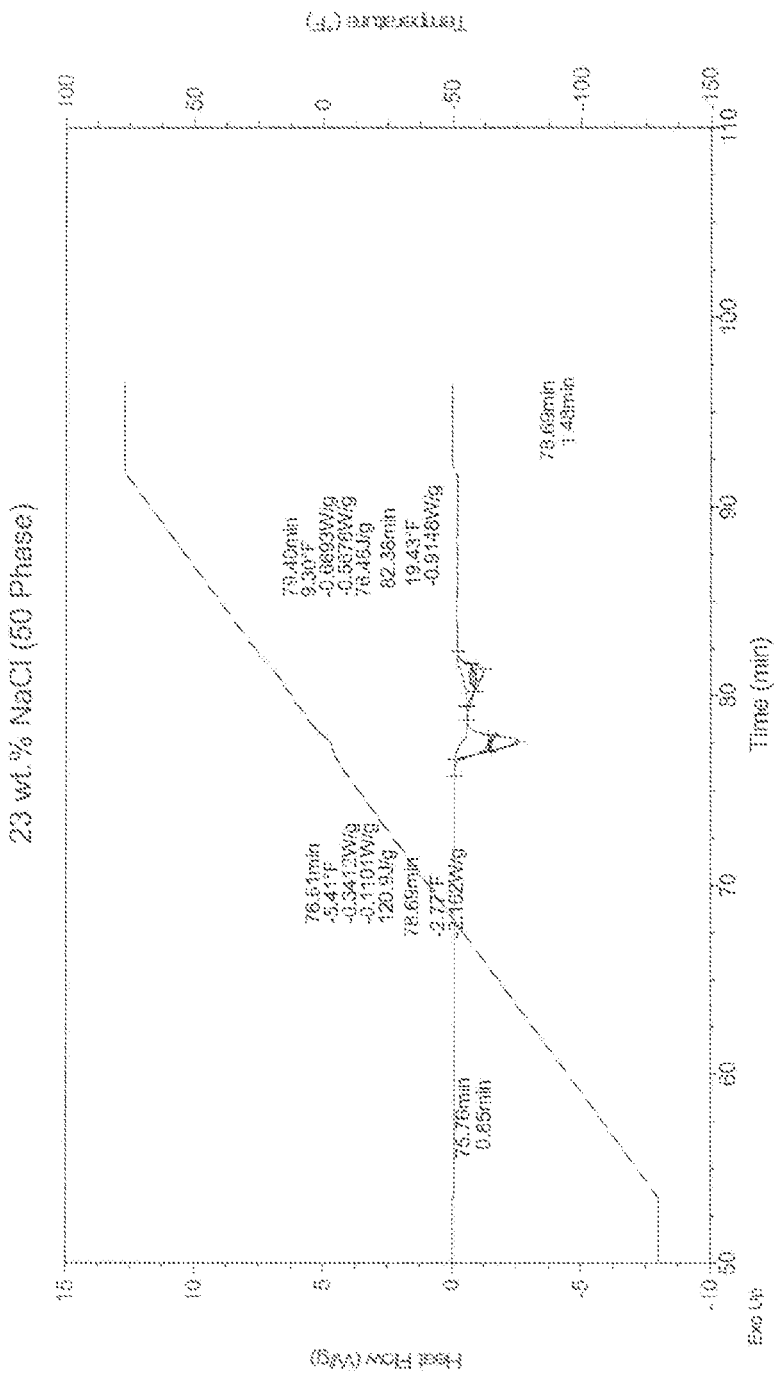
FIG. 2 shows a DSC scan of a diluted (50 Phase) 23 wt. % NaCl sample across a freezing point transition for the sample.

FIG. 2 is a DSC scan for a diluted (50 Phase) 23 wt. % NaCl sample in ice across a freezing point transition for the ice. The scan shows two peaks. The first peak represents the solid to liquid transition of the 23 wt. % NaCl portion of the sample. This is evidenced by comparable first heat flow inflection points (melting/freezing points) for the diluted (50 Phase) 23 wt. % NaCl sample and the undiluted (100 Phase) 23 wt. % NaCl sample, around −5.41° F. and −5.53° F. respectively. The second peak represents the solid to liquid transition of the 1 part water present in the 50 Phase sample. The second peak has a first heat flow inflection point (melting/freezing point) at around 9.3° F. which correlates with the melting/freezing point of an 11.5 wt. % NaCl sample.

Figure 3:
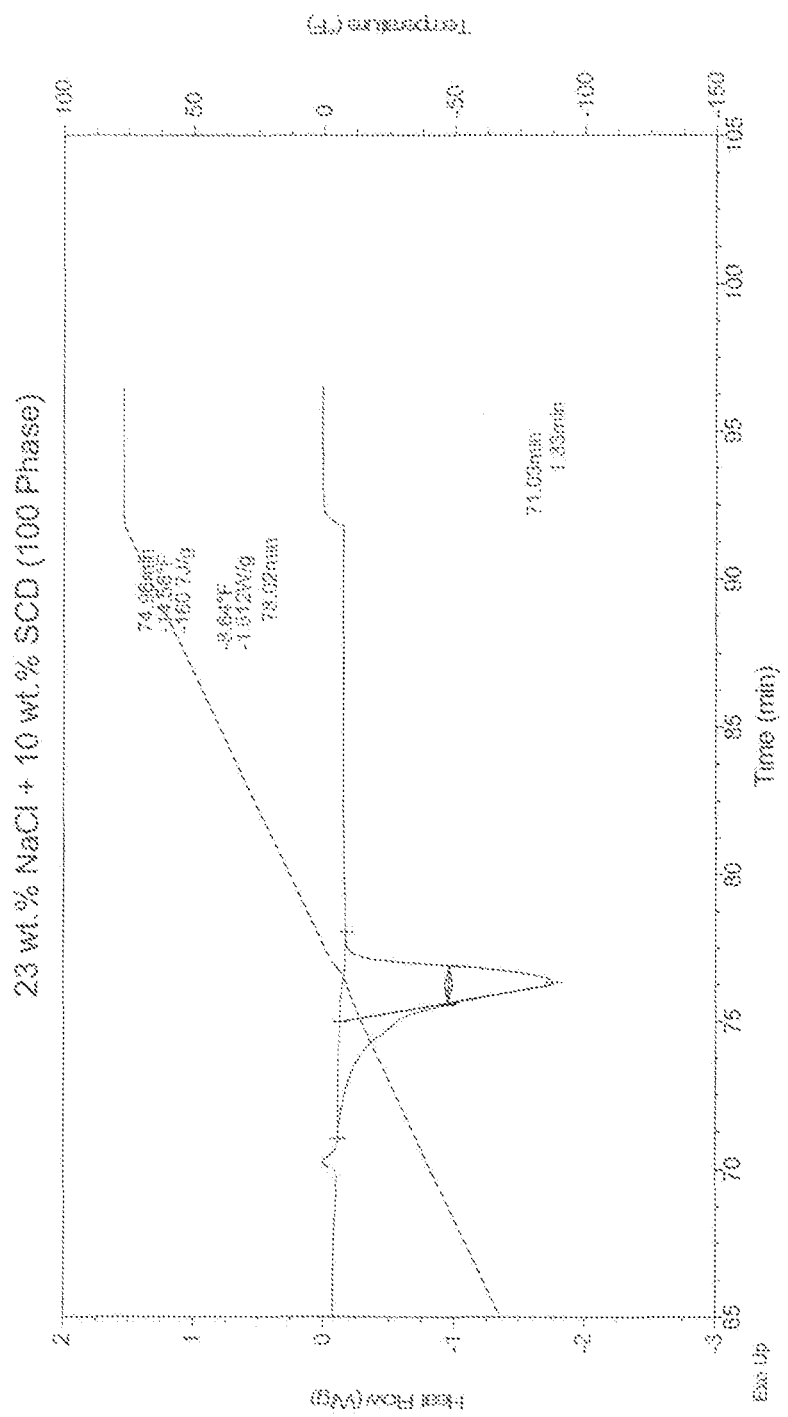
FIG. 3 shows a DSC scan of an undiluted (100 Phase) 23 wt. % NaCl+10 wt. % SCD sample across a freezing point transition for the sample.

A DSC scan for an undiluted (100 Phase) 23 wt. % NaCl+ 10 wt. % SCD sample in ice across a freezing point transition for the ice is shown in FIG. 3. The scan shows a single peak with a first heat flow inflection point at around −14.56° F., representing the melting/freezing point of the sample. This melting/freezing point is about 9° F. lower than the melting/freezing point of the undiluted (100 Phase) 23 wt. % NaCl sample without SCD (around −5.53° F.). The scan also shows a second heat flow inflection point at around −8.64° F., representing the temperature at which the undiluted (100 Phase) 23 wt. % NaCl+10 wt. % SCD sample completely melted. This temperature is about 8° F. lower than the temperature at which the undiluted (100 Phase) 23 wt. % NaCl sample without SCD completely melted (around −0.45° F.).

Figure 4:
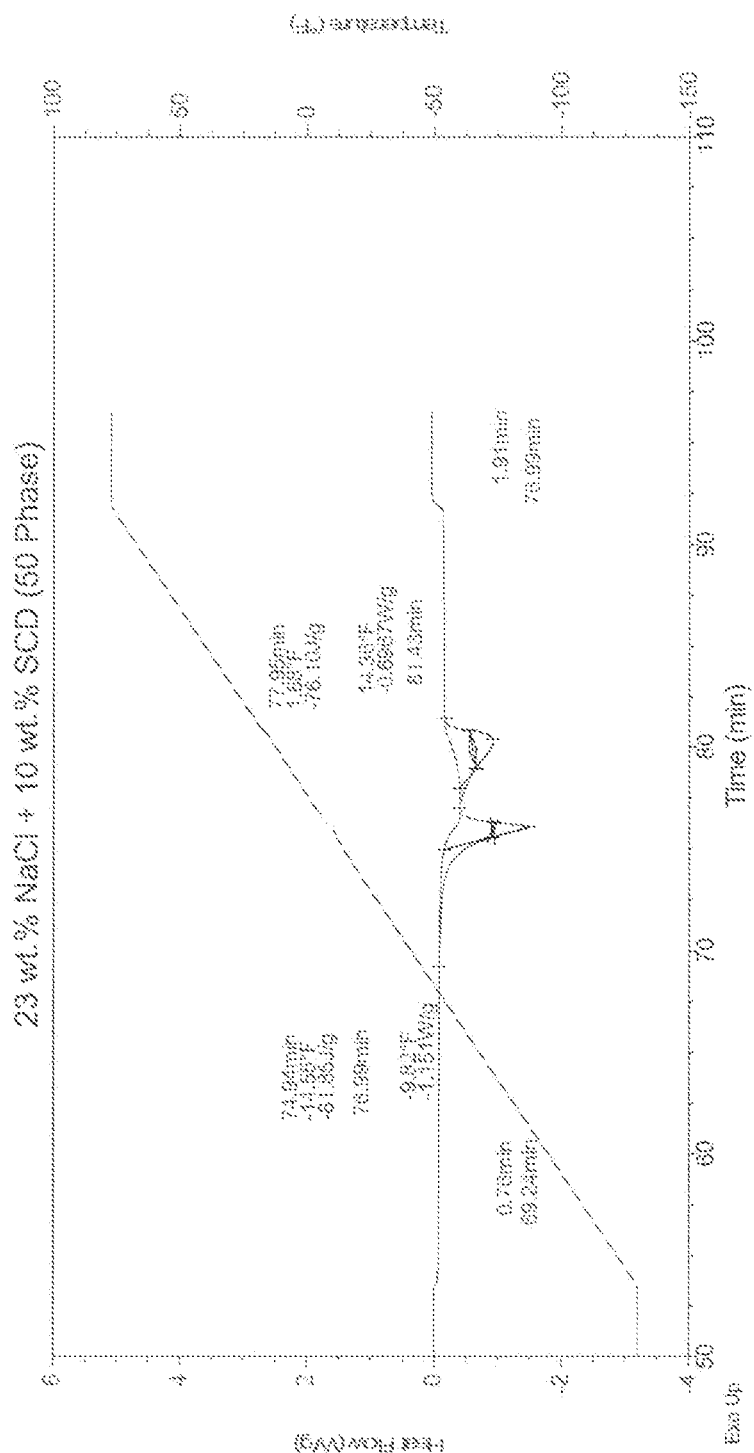
FIG. 4 shows a DSC scan of a diluted (50 Phase) 23 wt. % NaCl+10 wt. % SCD sample across a freezing point transition for the sample.

FIG. 4 is a DSC scan showing a diluted (50 Phase) 23 wt. % NaCl+10 wt. % SCD sample in ice across a freezing point transition for the ice. The scan shows two peaks. The first peak represents the solid to liquid transition of the 23 wt. % NaCl+10 wt. % SCD portion of the sample. This is evidenced by comparable first heat flow inflection points (melting/freezing points) for the diluted (50 Phase) 23 wt. % NaCl+10 wt. % SCD sample and the undiluted (100 Phase) 23 wt. % NaCl+10 wt. % SCD sample, around −14.55° F. and −14.56° F. respectively. The melting/freezing point for the diluted (50 Phase) 23 wt. % NaCl+10 wt. % SCD sample, −14.55° F., is about 9° F. lower than the melting/freezing point for the diluted (50 Phase) 23 wt. % NaCl sample without SCD (around −5.41° F.).

The second peak on the DSC scan for the diluted (50 Phase) 23 wt. % NaCl+10 wt. % SCD sample in ice represents the solid to liquid transition of the 1 part water present in the 50 Phase sample. The second peak has a first heat flow inflection point (melting/freezing point) at around 1.67° F. This melting/freezing point is about 8° F. less than the melting/freezing point for the diluted (50 Phase) 23 wt. % NaCl sample without SCD (around 9.3° F.).

Figure 5:
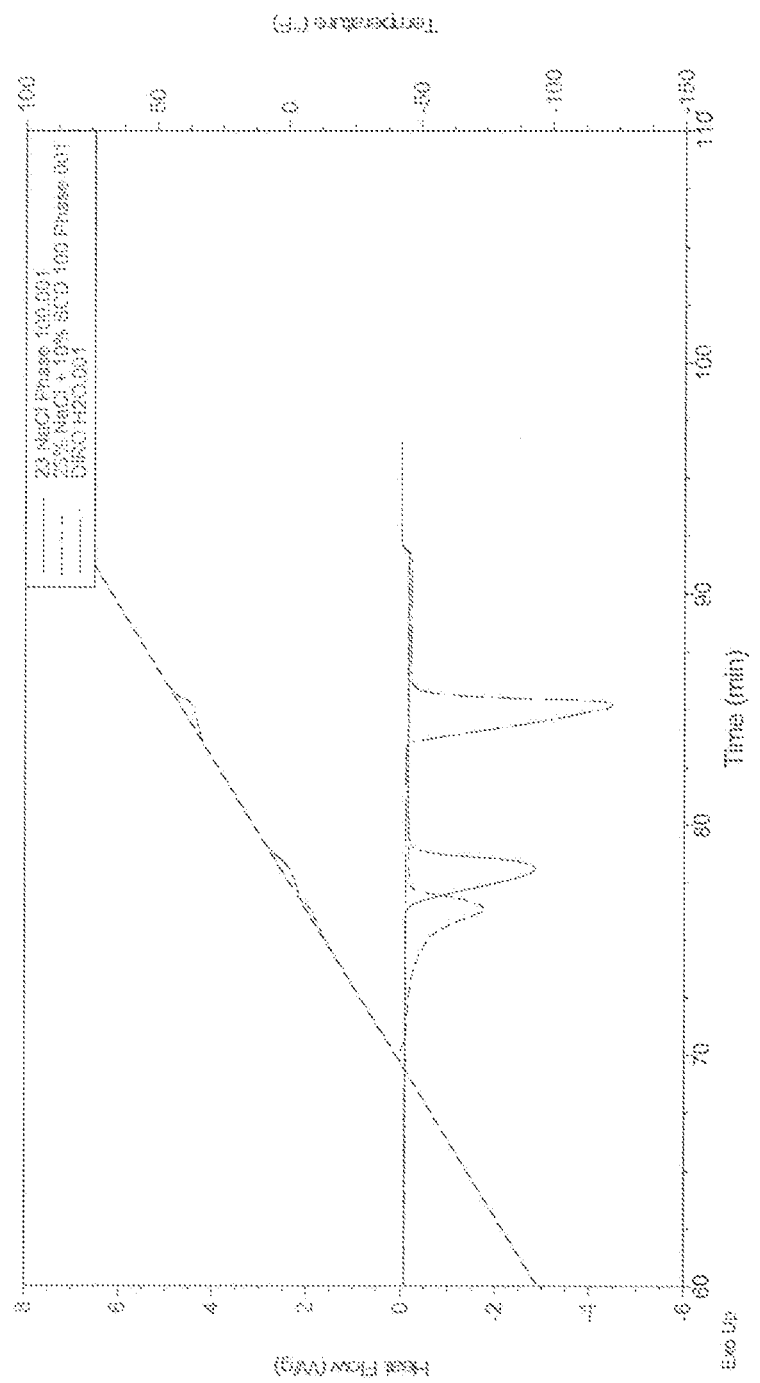
FIG. 5 shows comparative DSC plots of undiluted (100 Phase) samples across the freezing point transitions for those samples.

FIG. 5 shows comparative DSC plots for water, an undiluted (100 Phase) 23 wt. % NaCl sample, and an undiluted (100 Phase) 23 wt. % NaCl+10 wt. % SCD sample across a freezing point transition for the samples. The plots show that an undiluted (100 Phase) 23 wt. % NaCl+10 wt. % SCD sample begins to melt faster than an undiluted (100 Phase) 23 wt. % NaCl sample without SCD. The plots also show that the time it takes for an undiluted (100 Phase) 23 wt. % NaCl+10 wt. % SCD sample to completely melt is less than the time it takes for an undiluted (100 Phase) 23 wt. % NaCl sample without SCD to completely melt.

Figure 6:
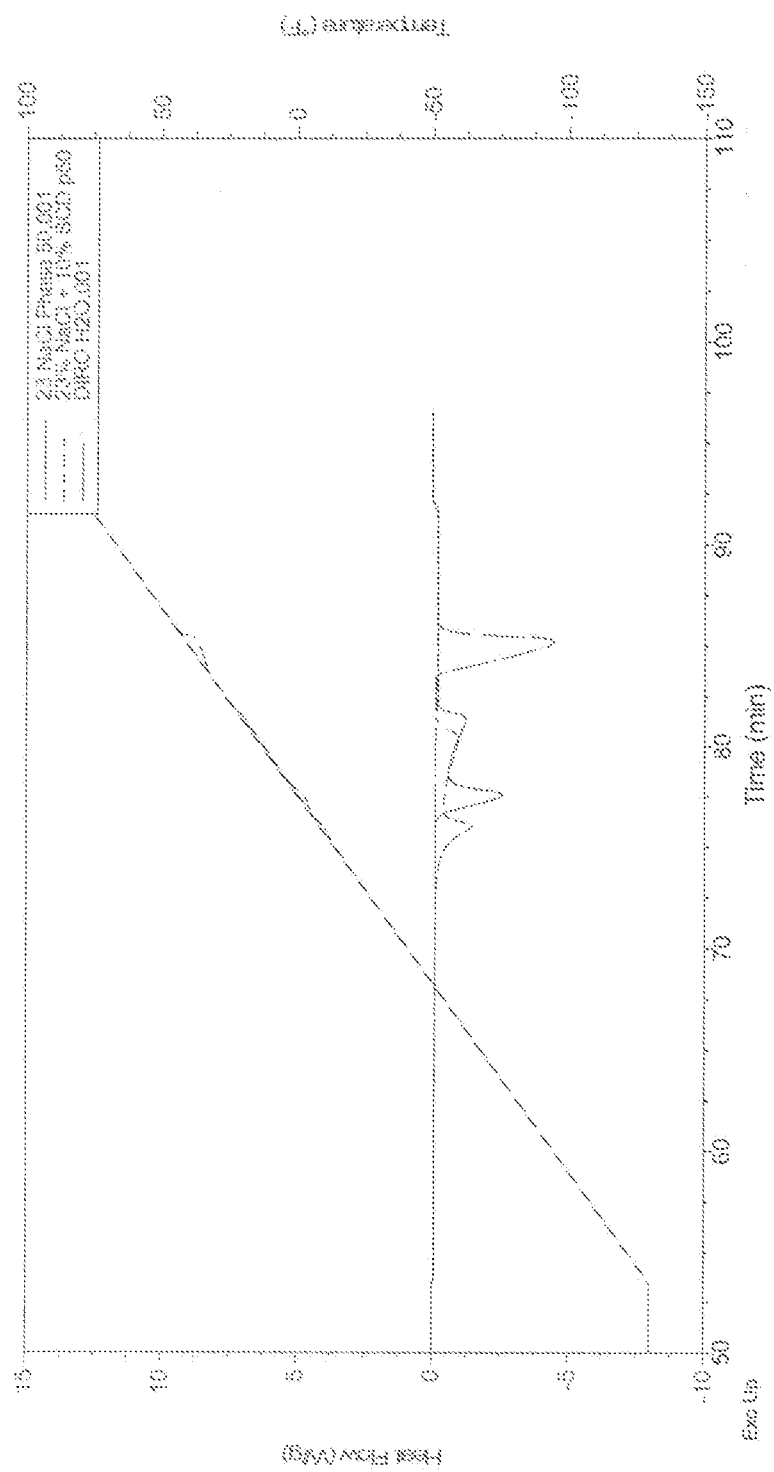
FIG. 6 shows comparative DSC plots of diluted (50 Phase) samples across the freezing point transitions for those samples.
Figure 7:
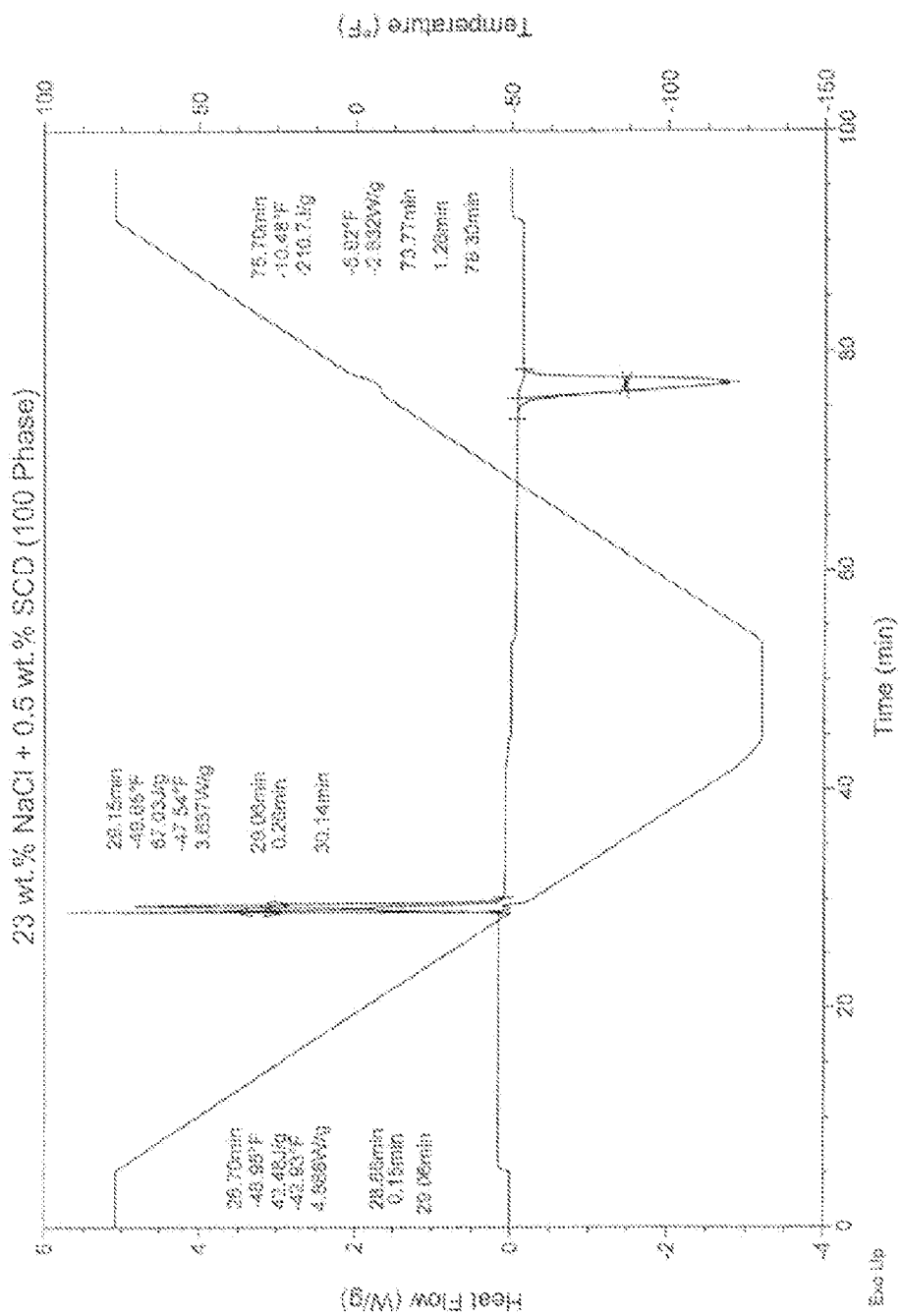
FIGS. 7-26 show DSC scans of diluted (50 Phase) and undiluted (100 Phase) 23 wt. % NaCl samples with varying concentrations of SCD across the freezing point transitions for the samples.
Figure 8:
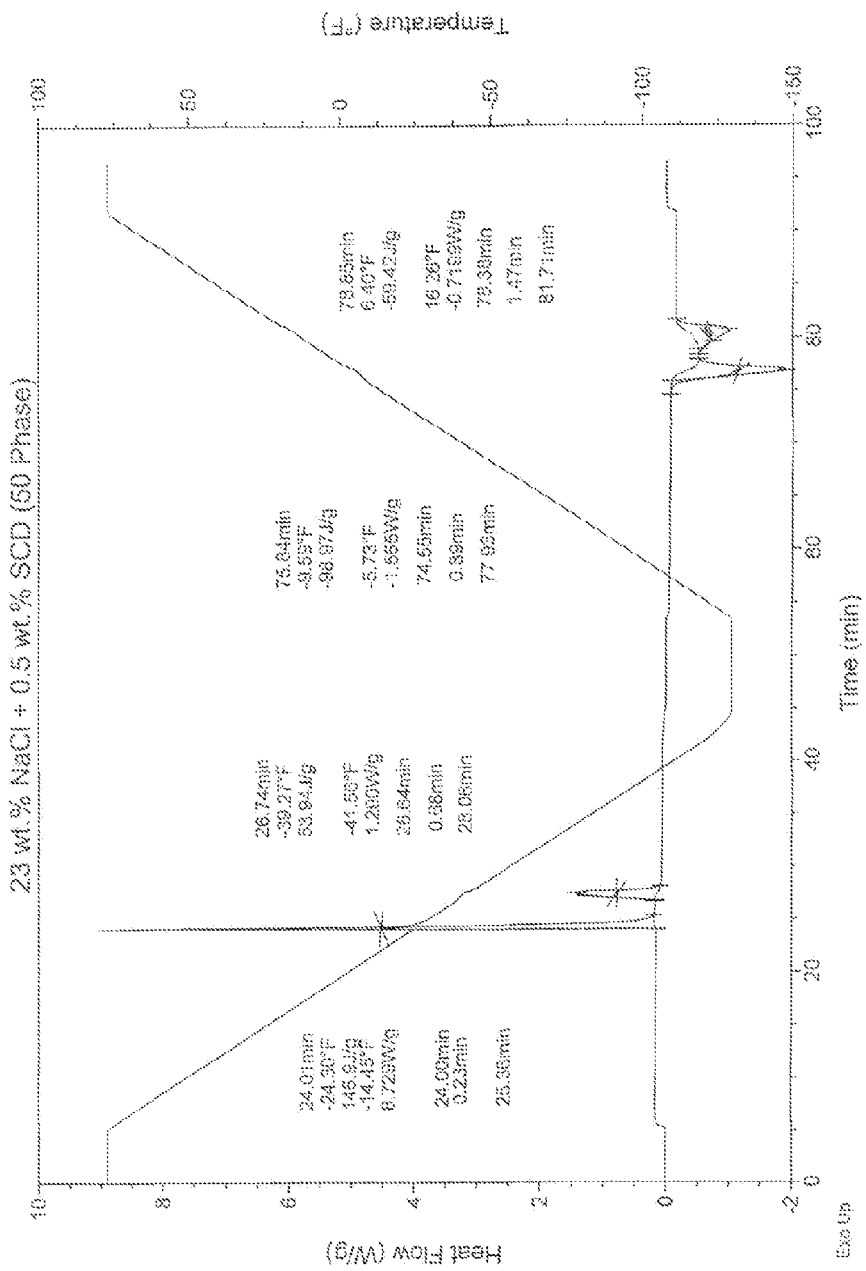
Figure 9:
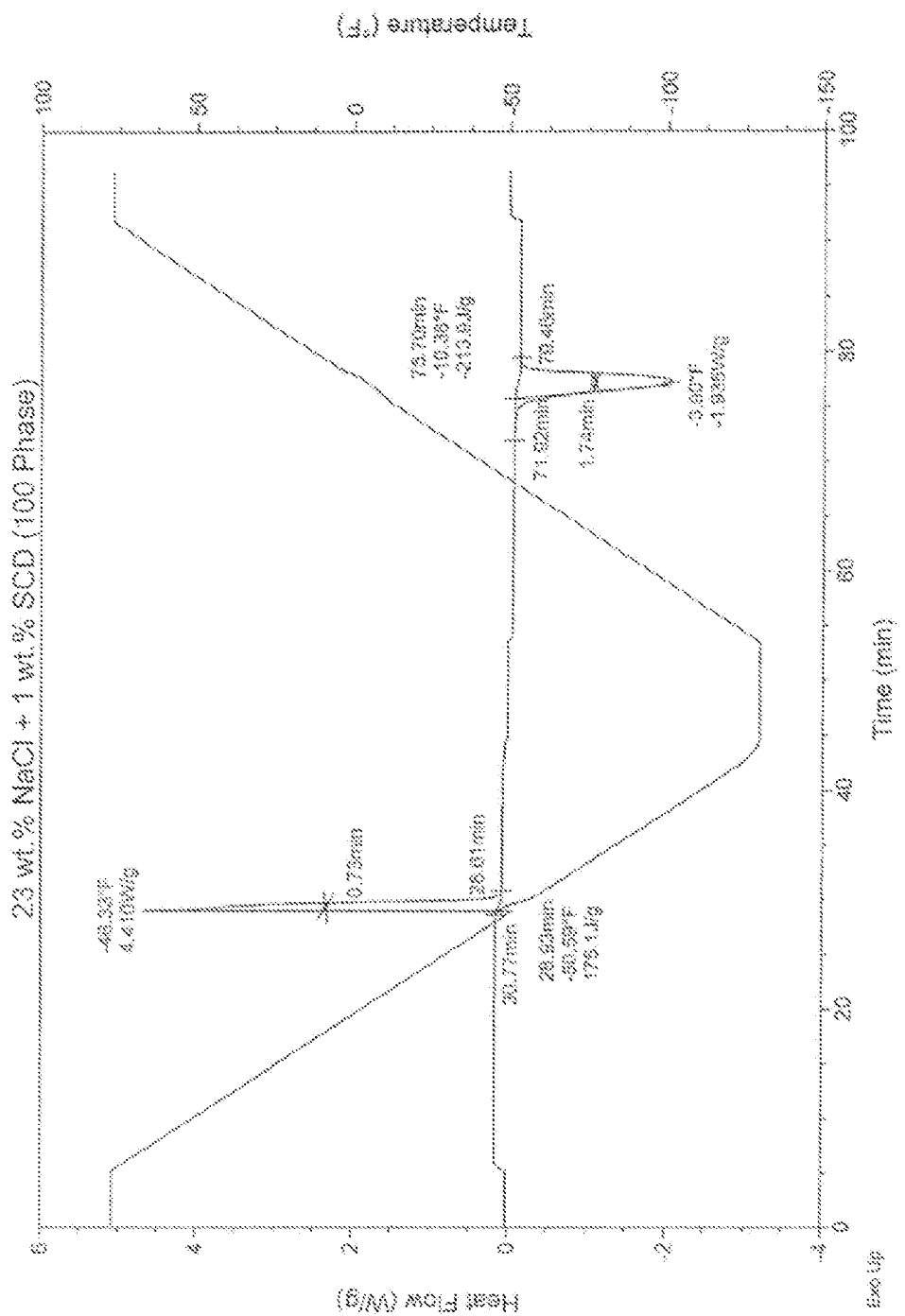
Figure 10:
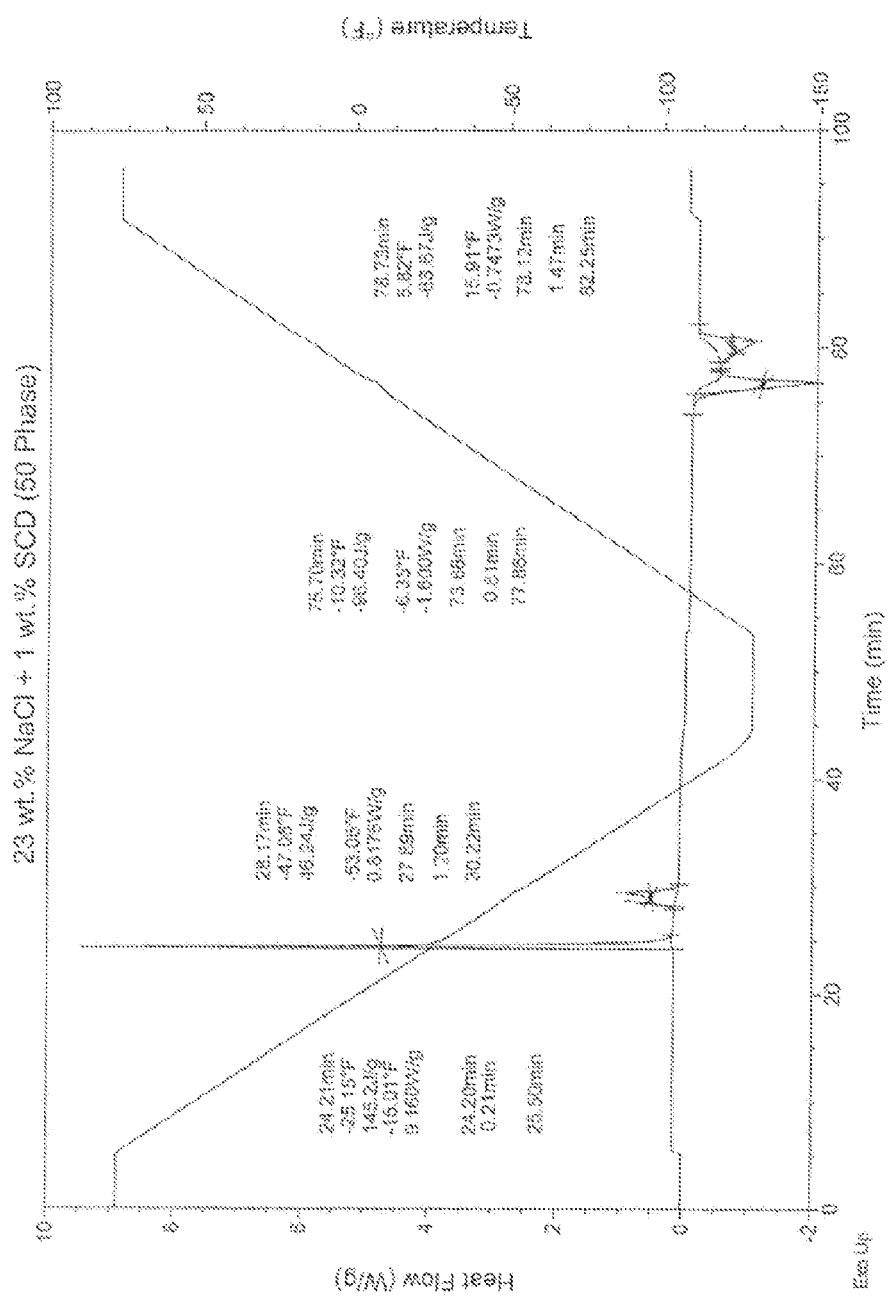
Figure 11:
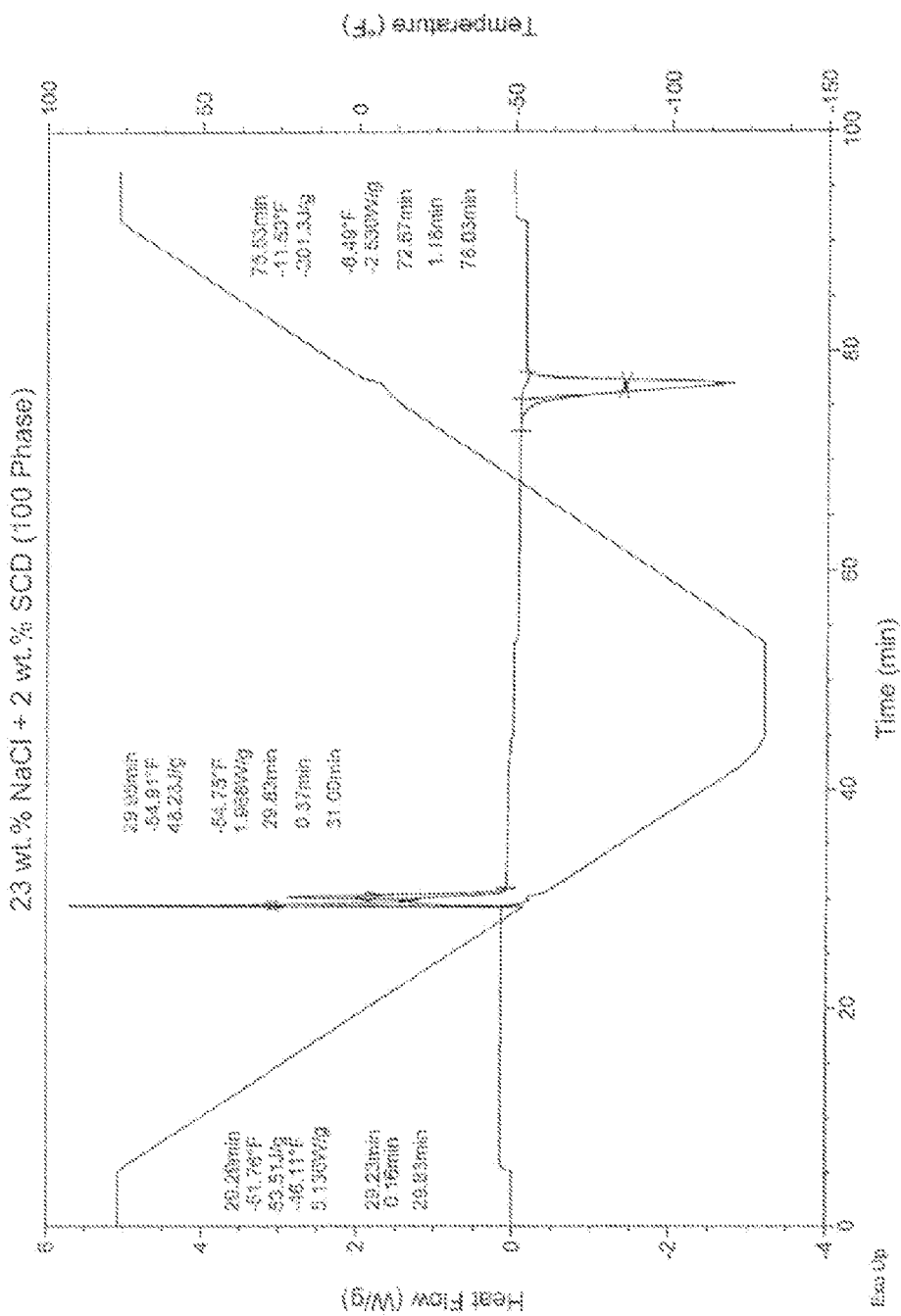
Figure 12:
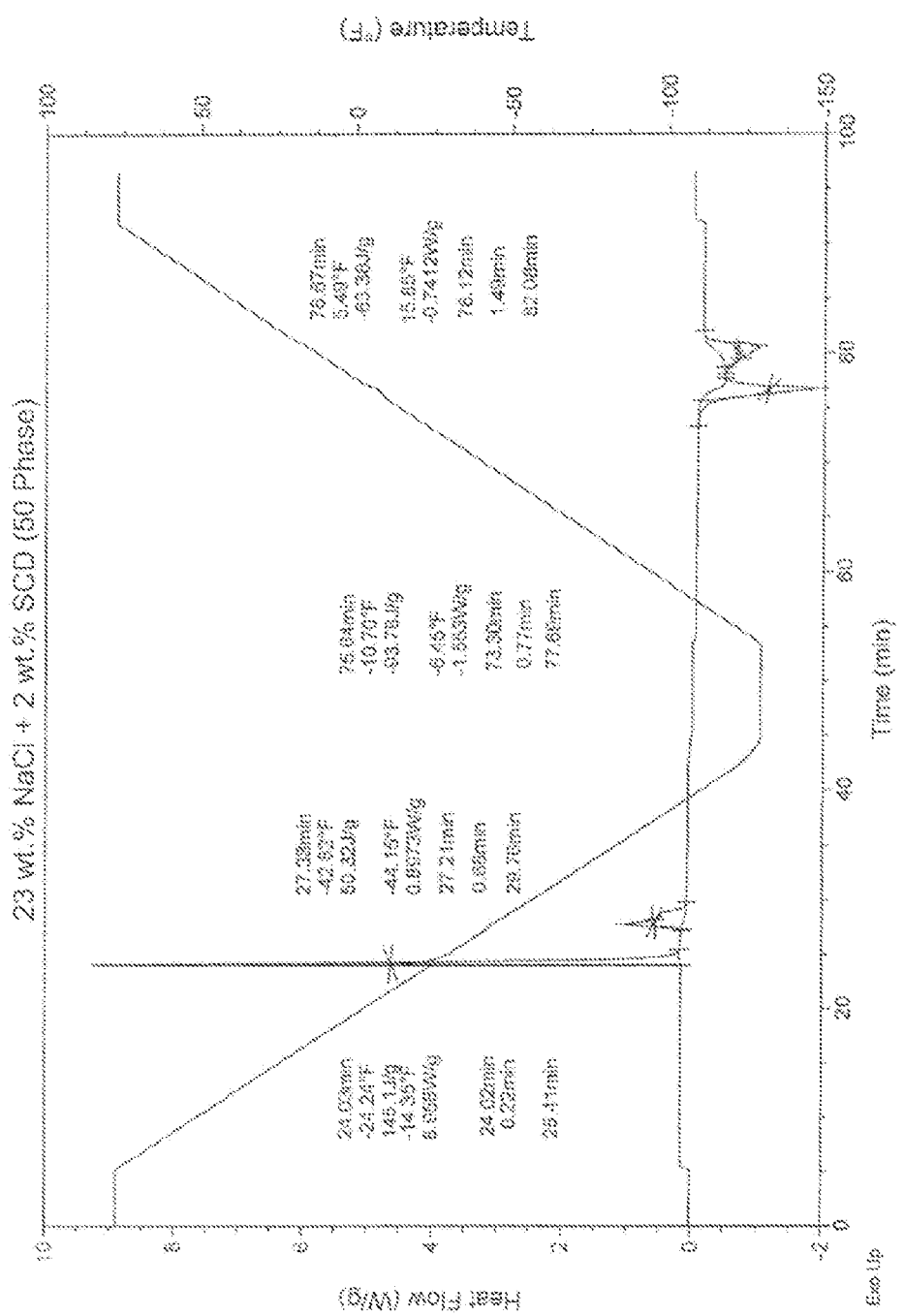
Figure 13:
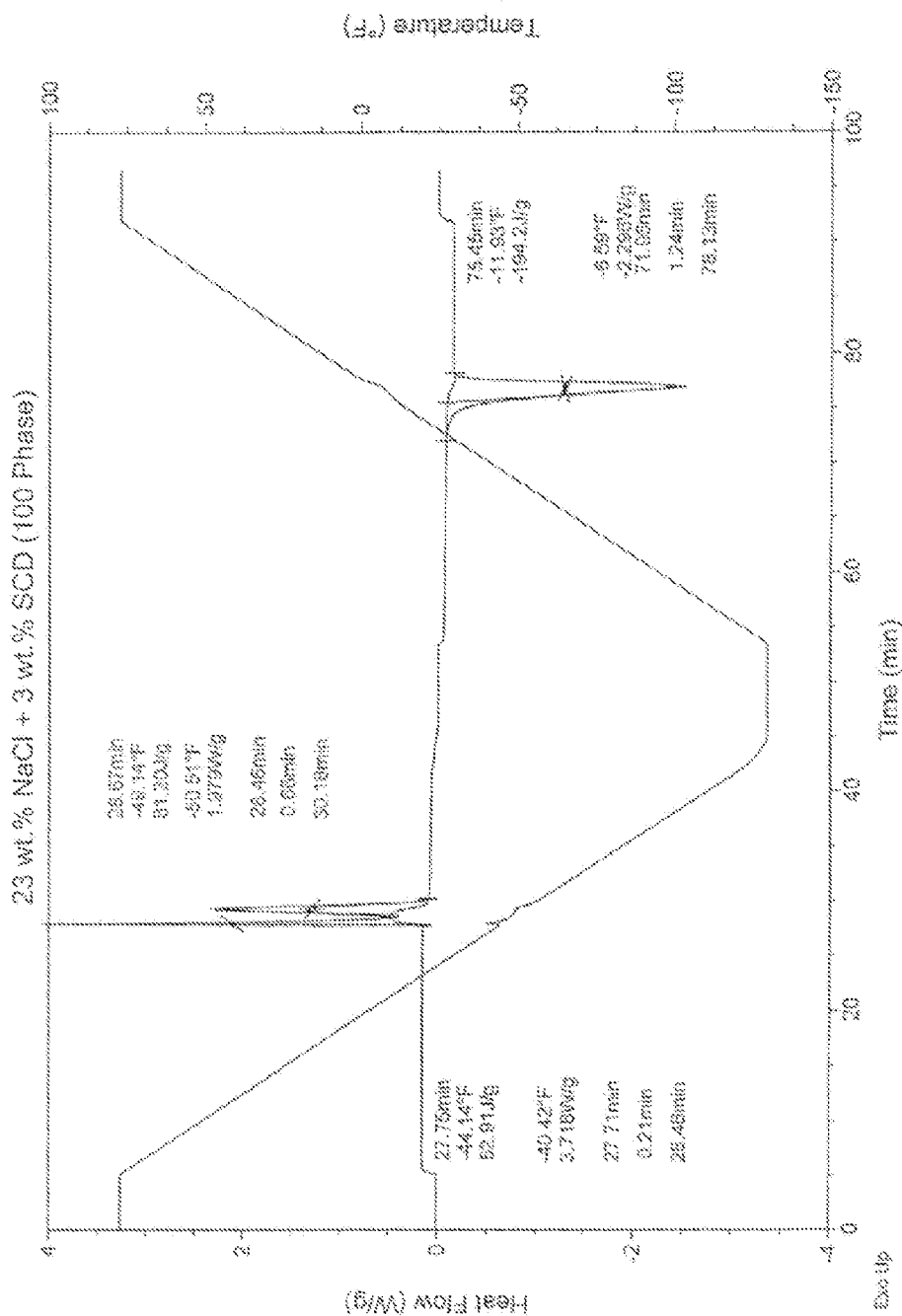
Figure 14:
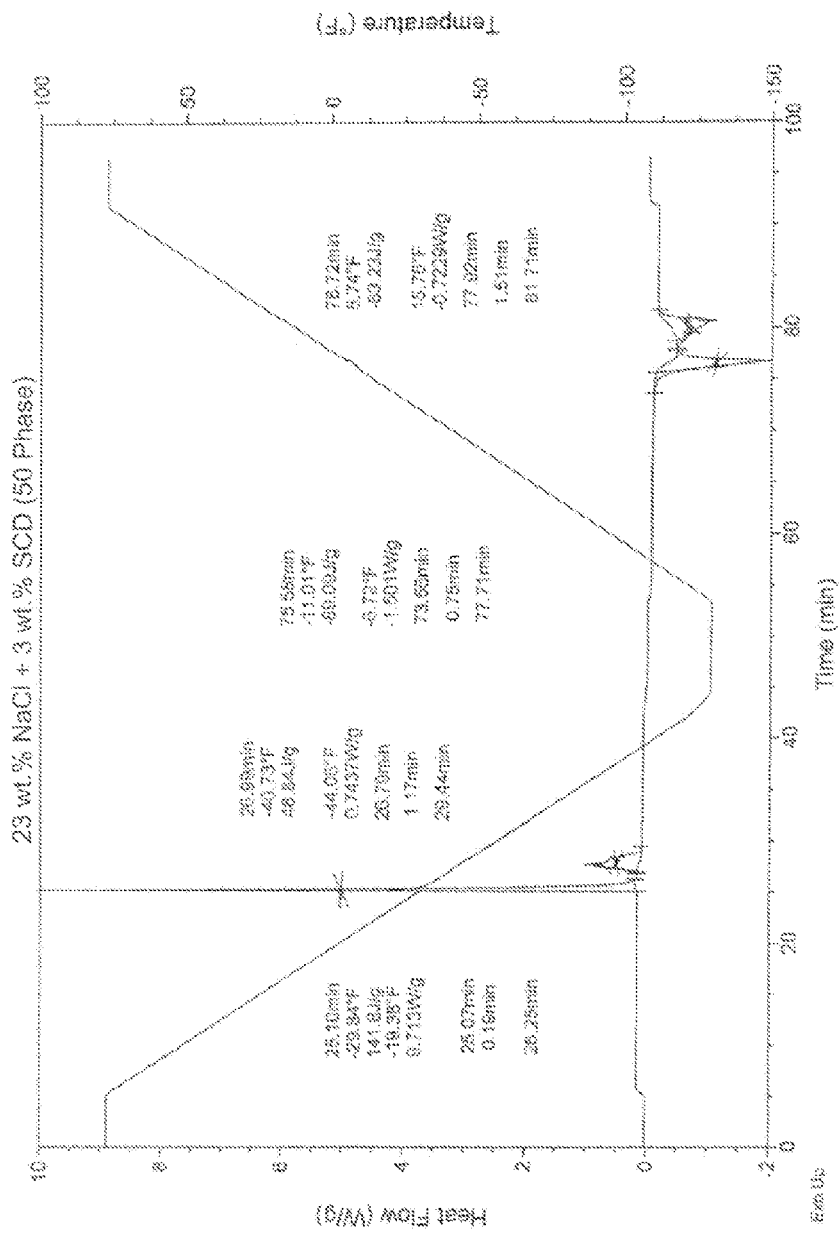
Figure 15:
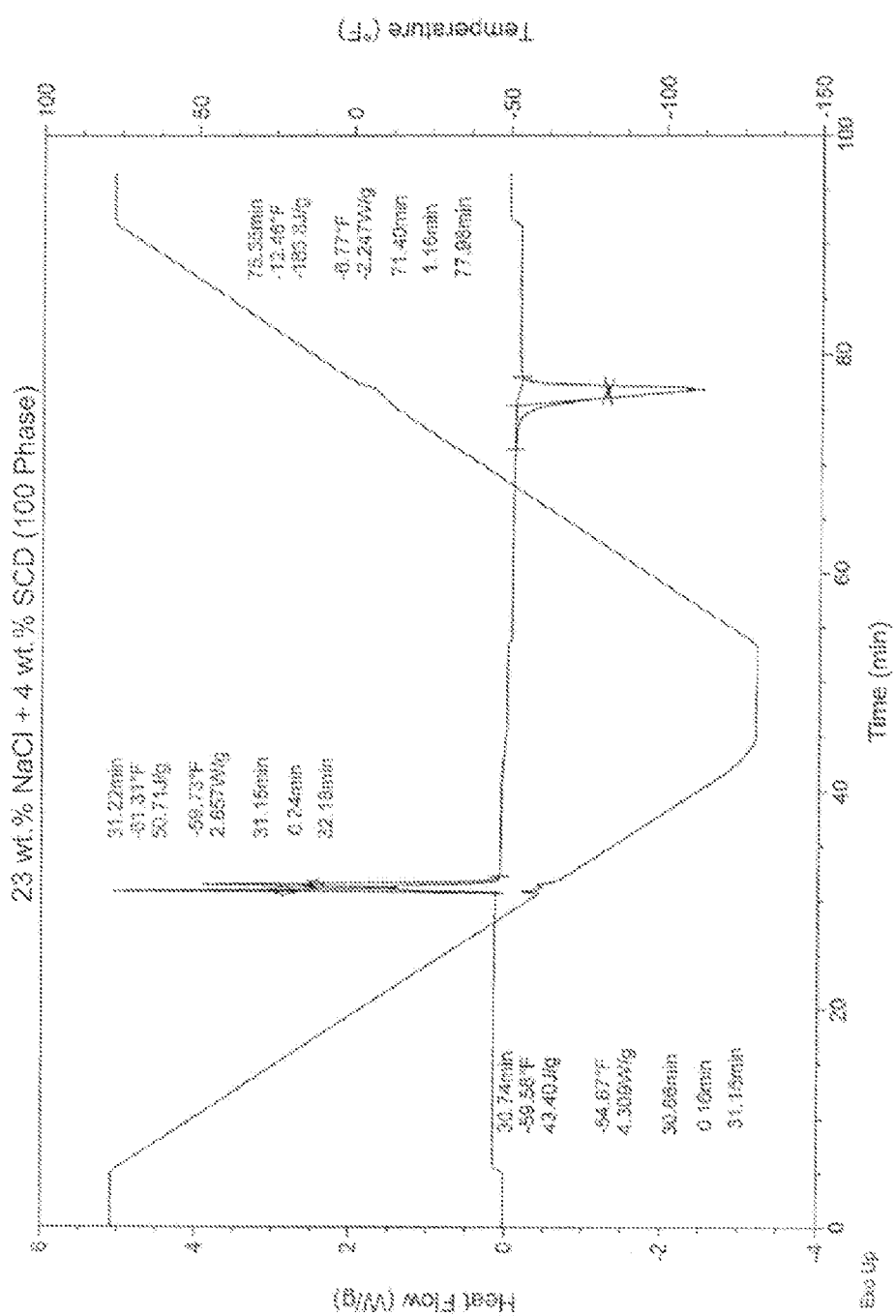
Figure 16:
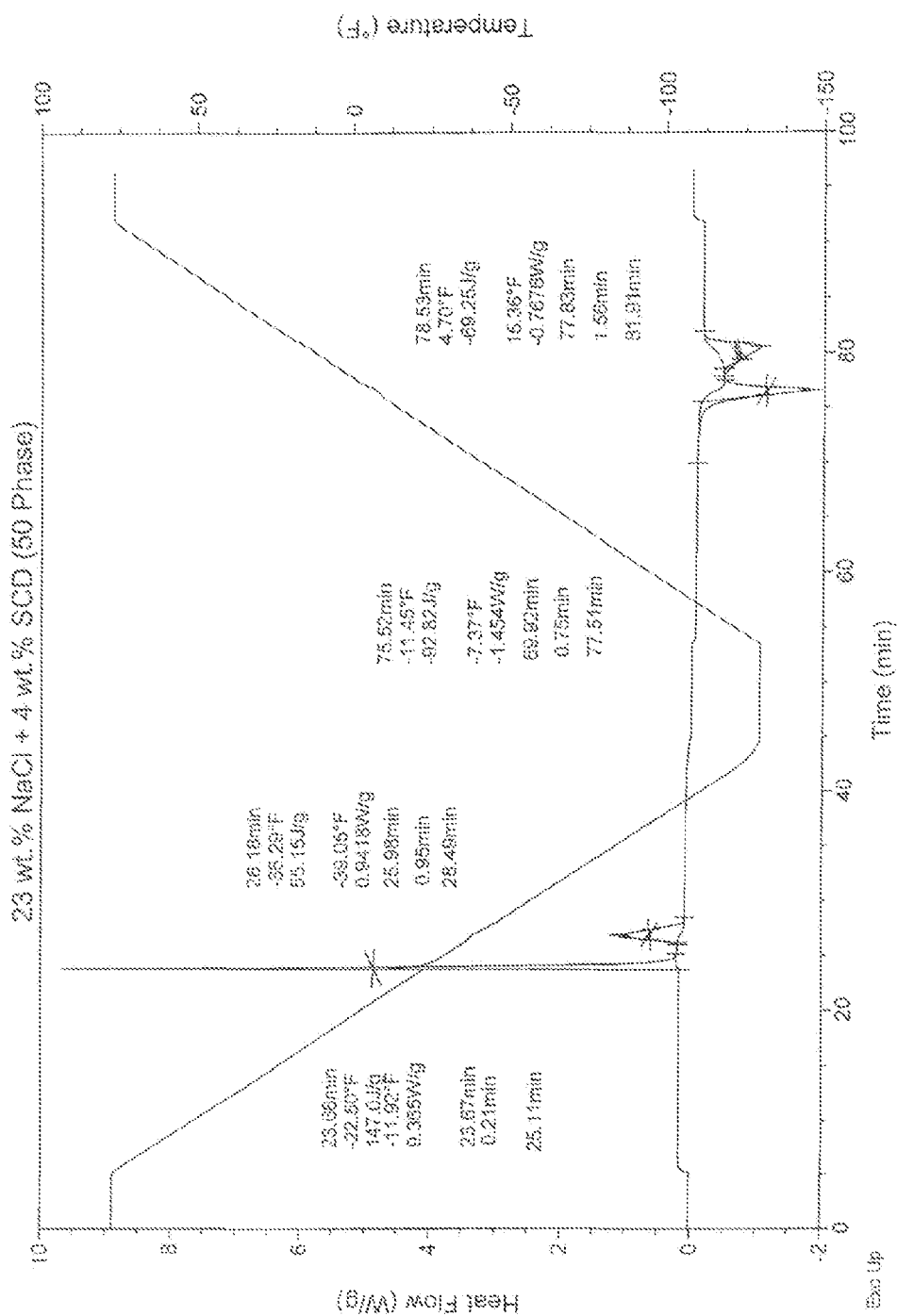
Figure 17:
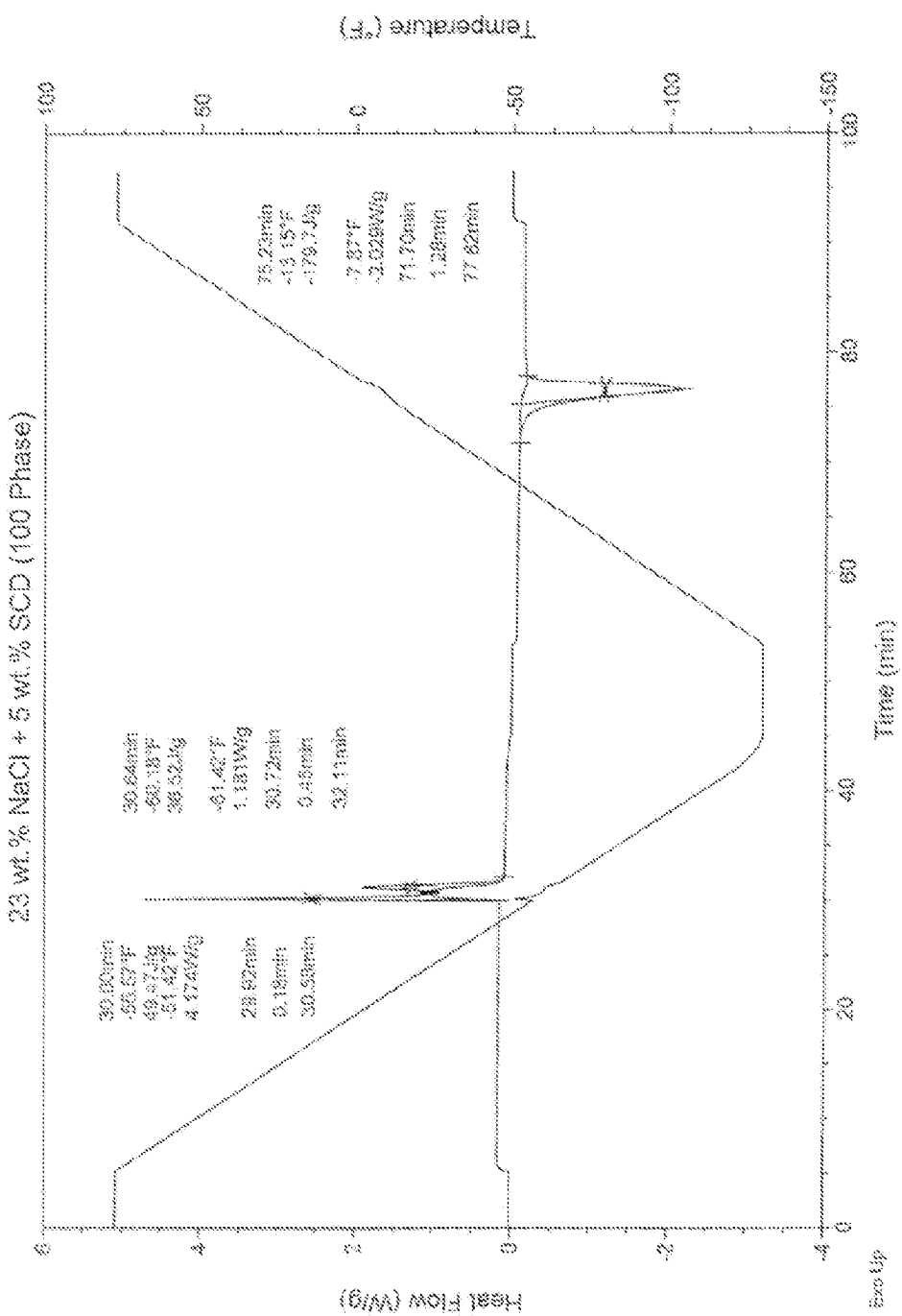
Figure 18:
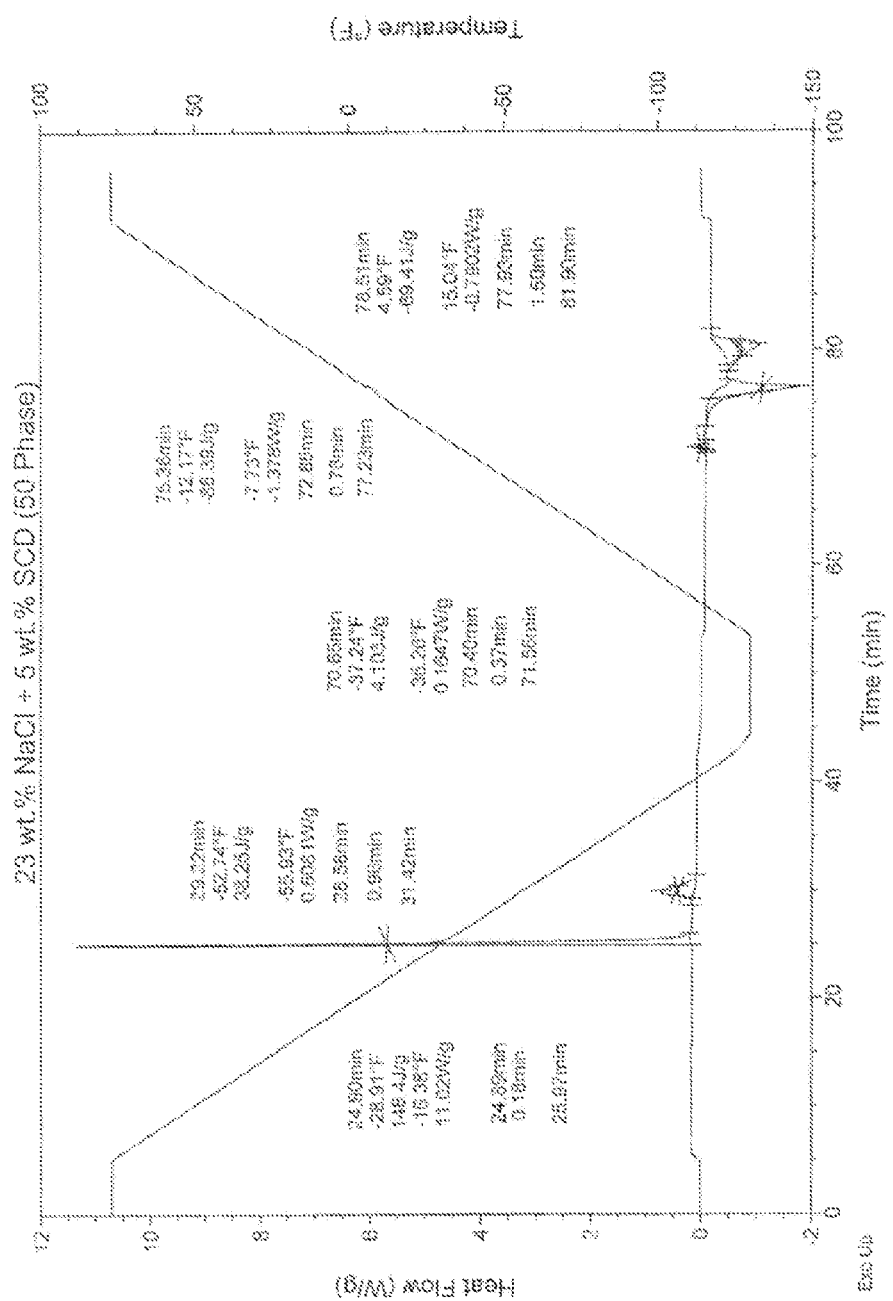
Figure 19:
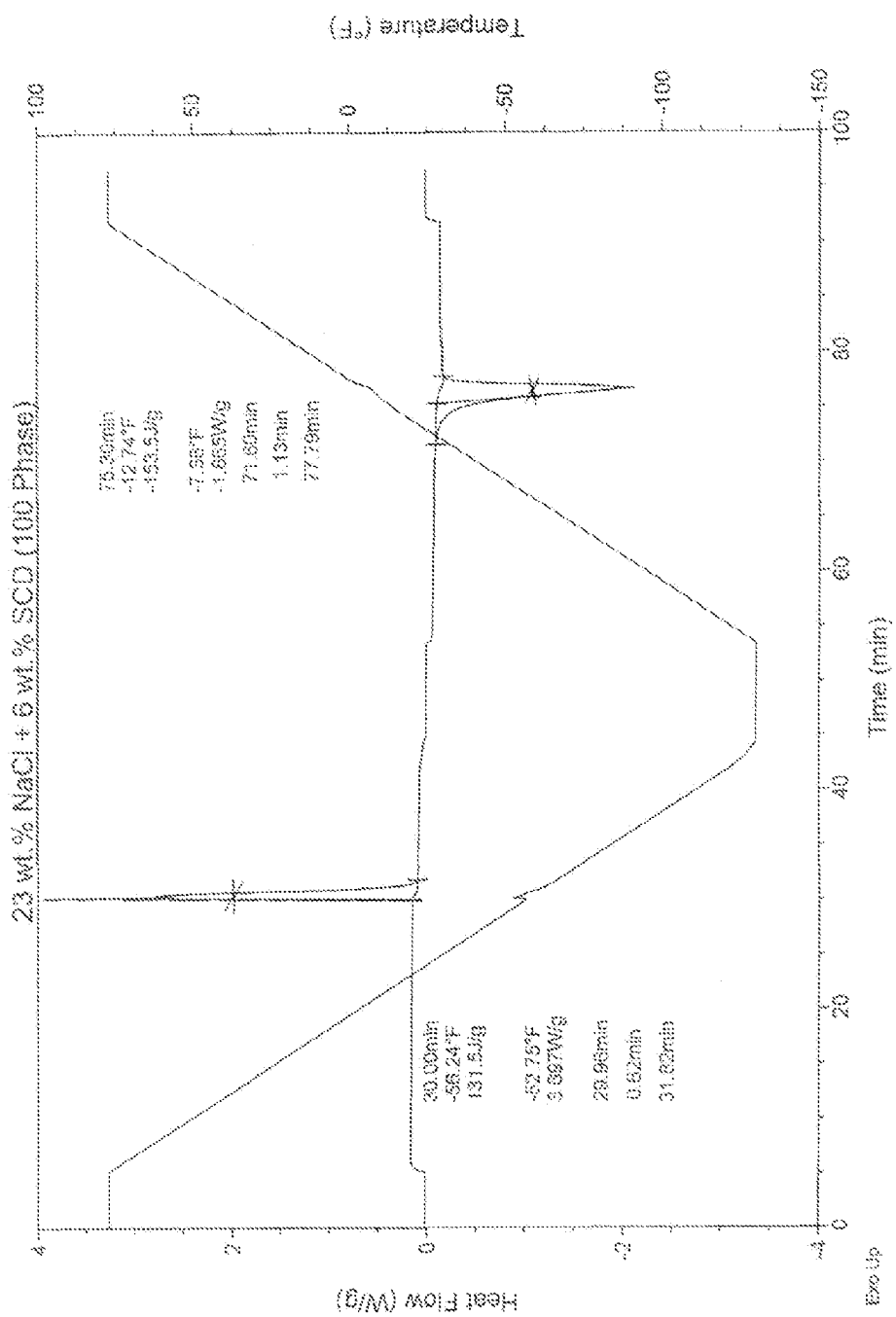
Figure 20:
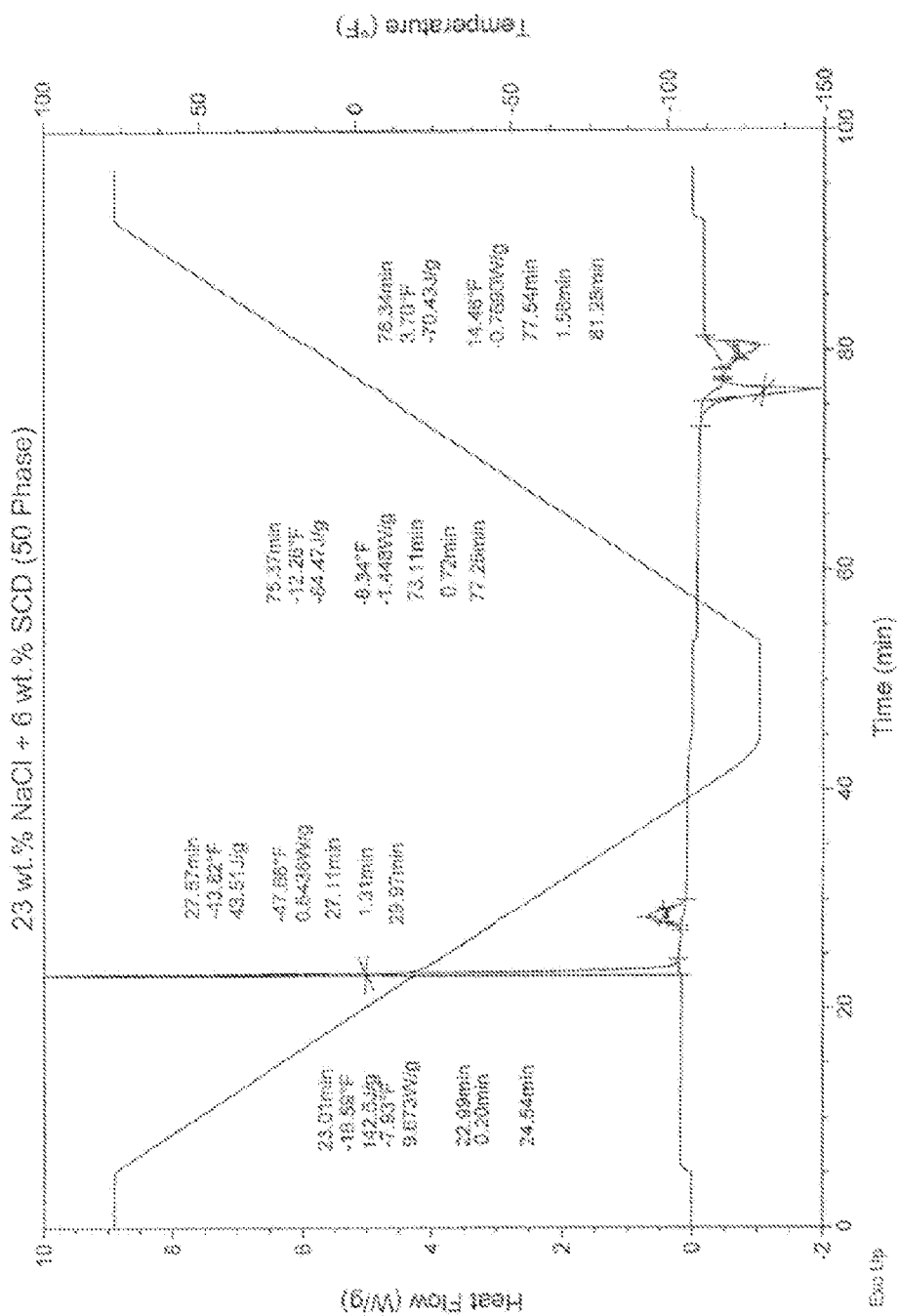
Figure 21:
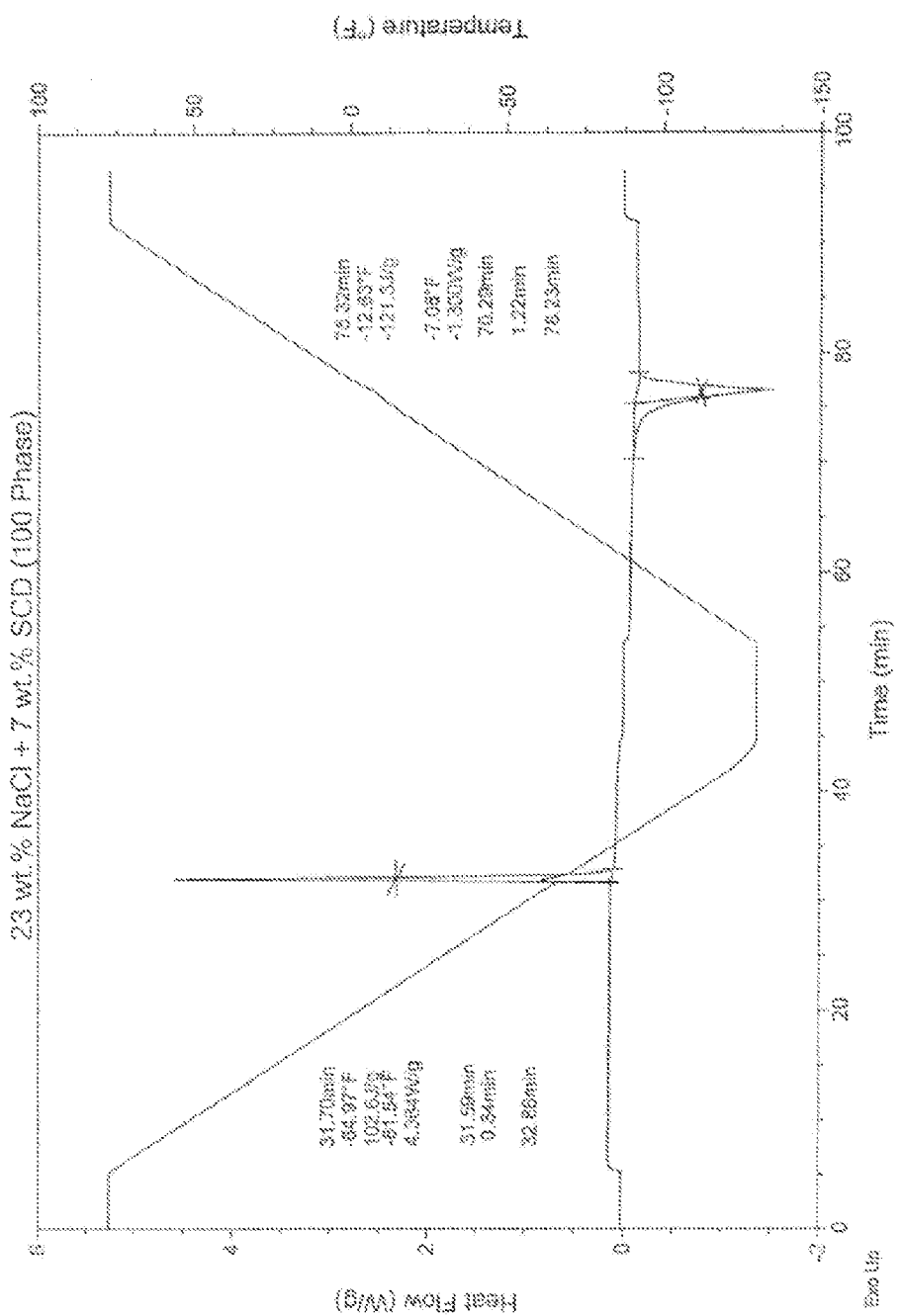
Figure 22:
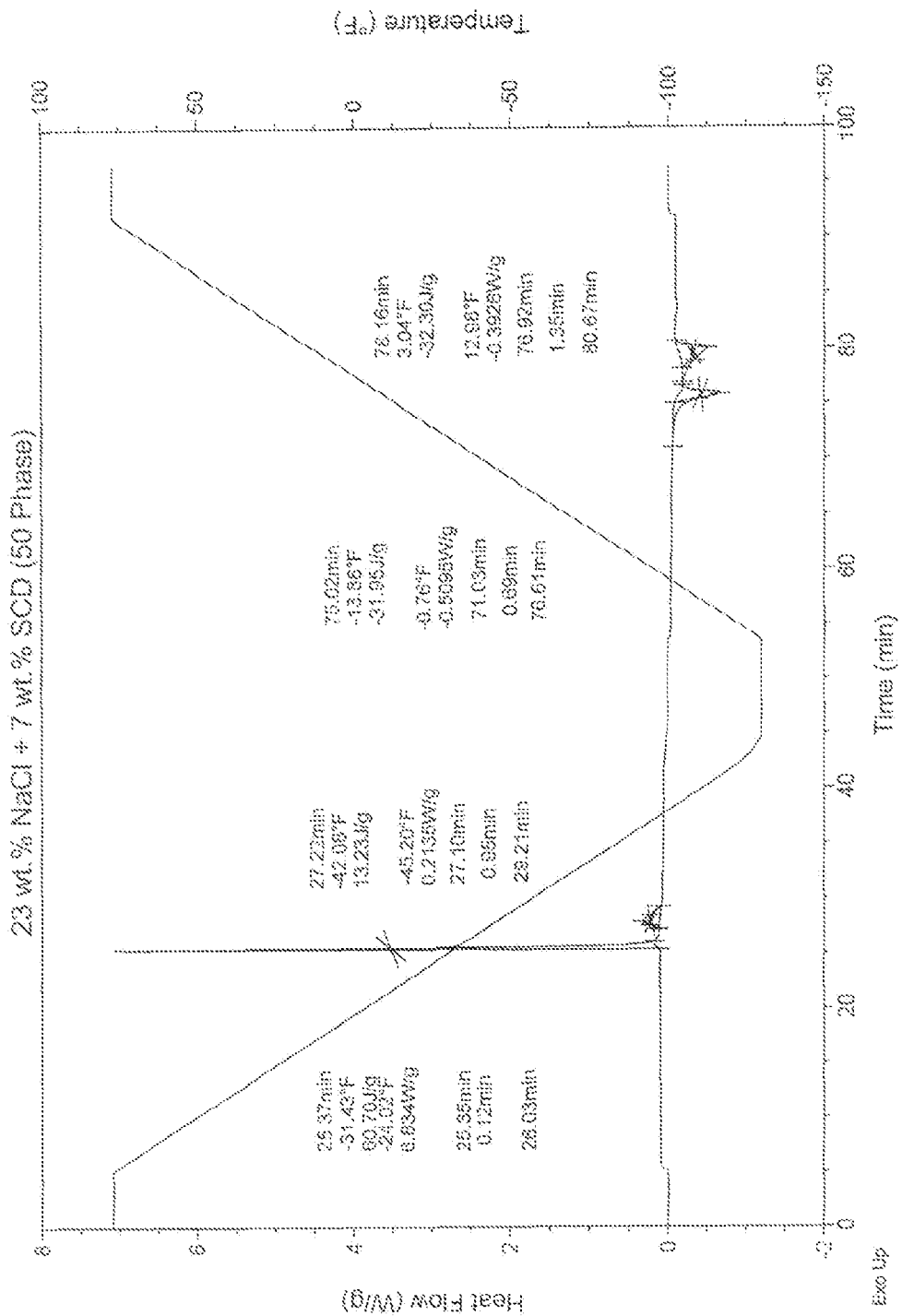
Figure 23:
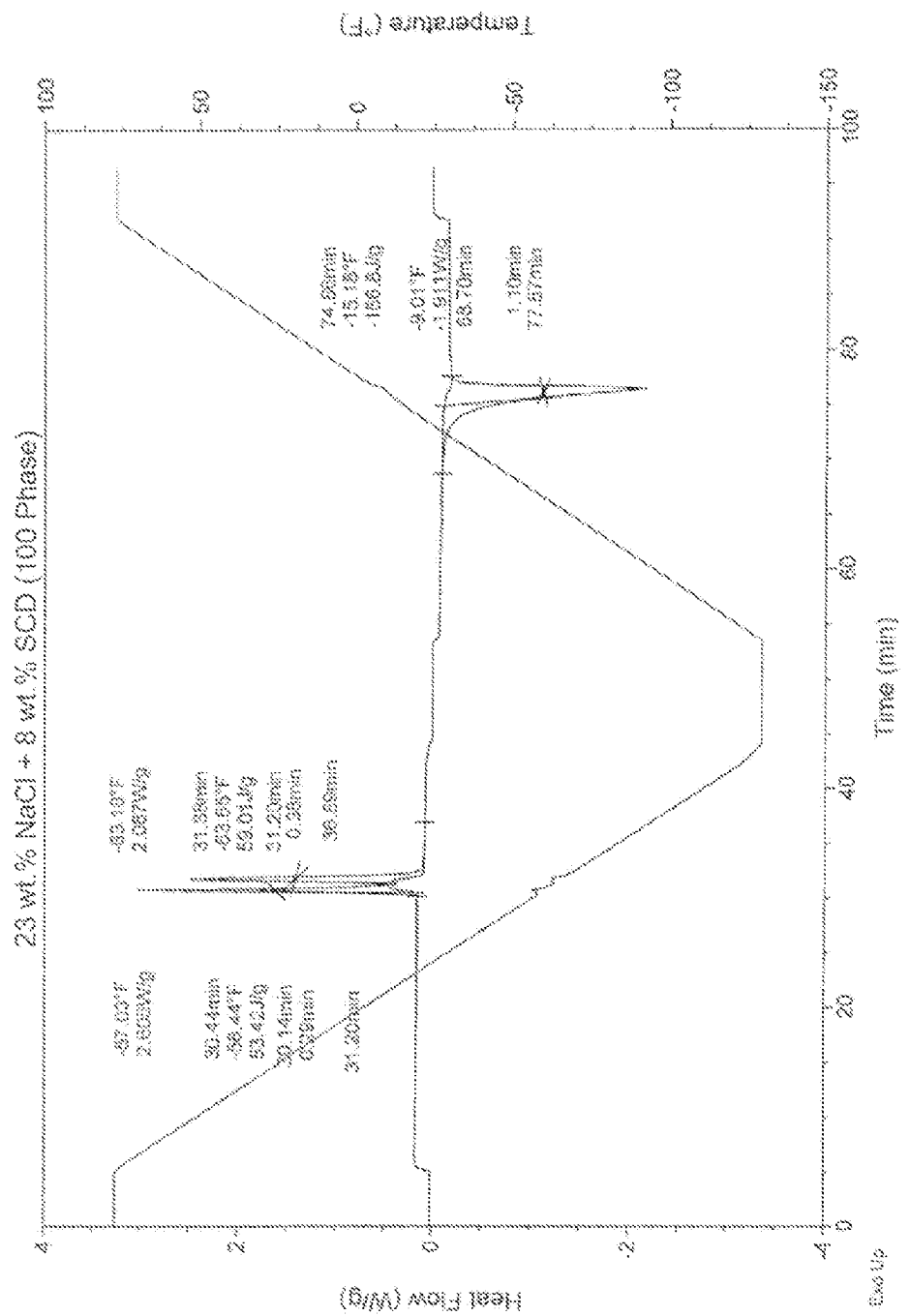
Figure 24:
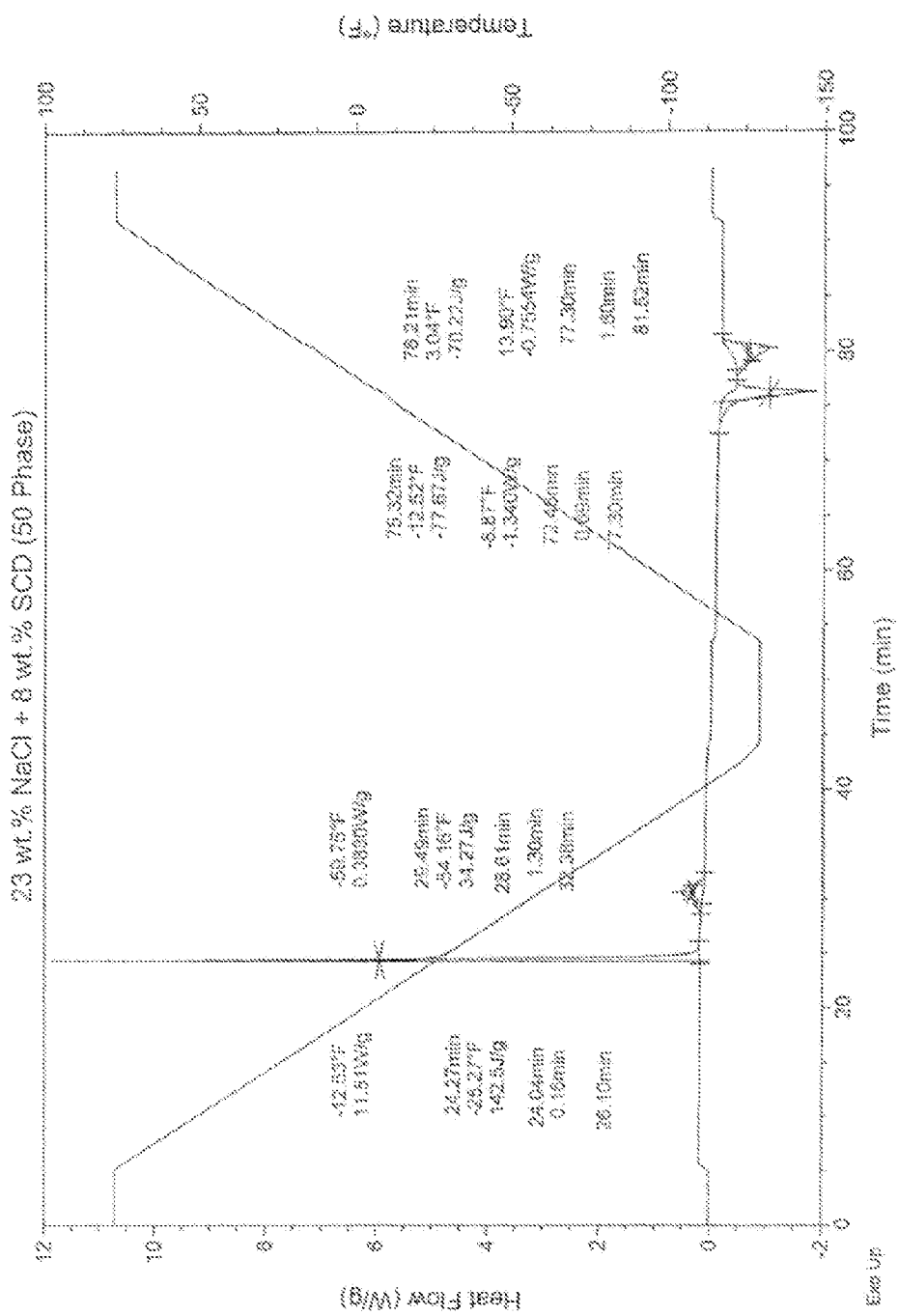
Figure 25:
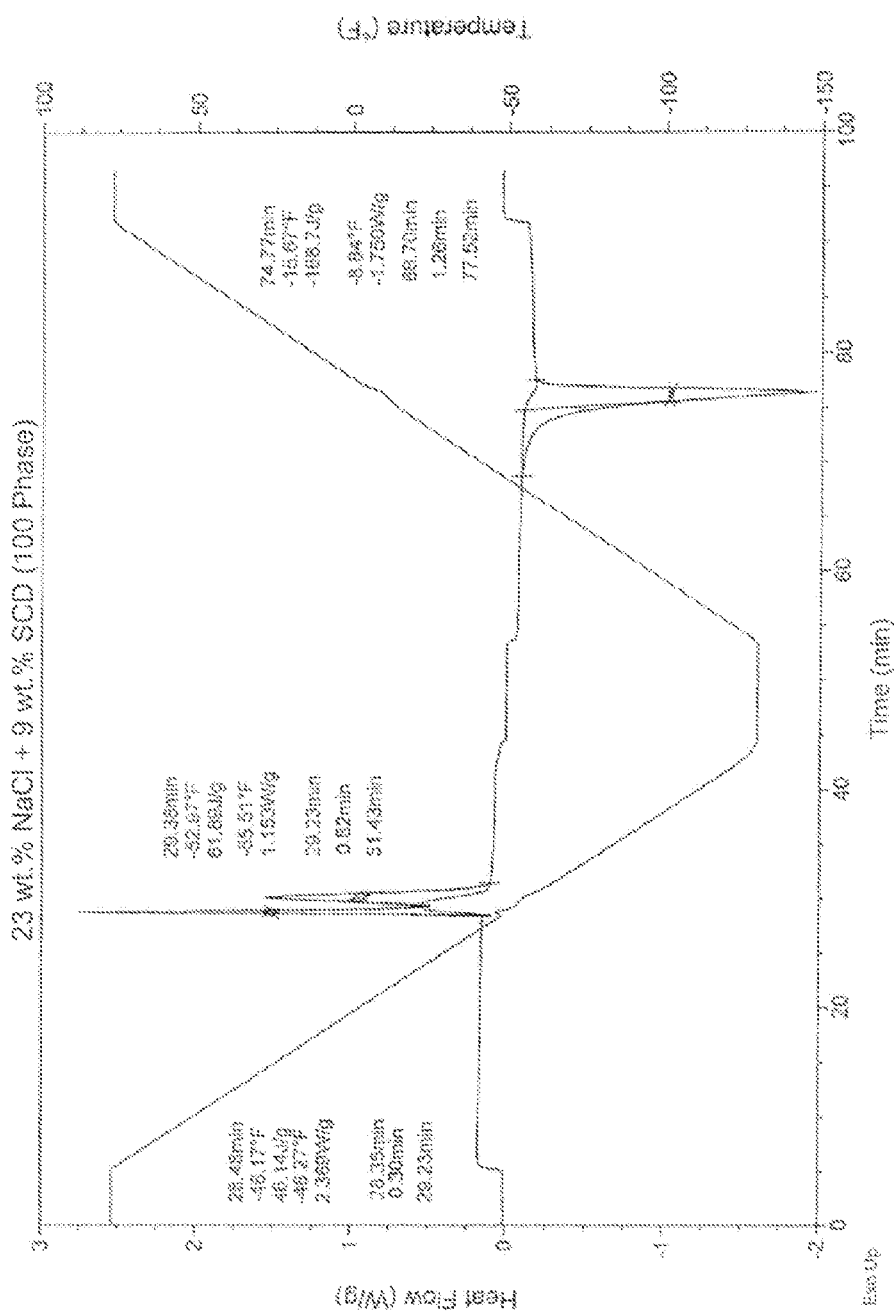
Figure 26:
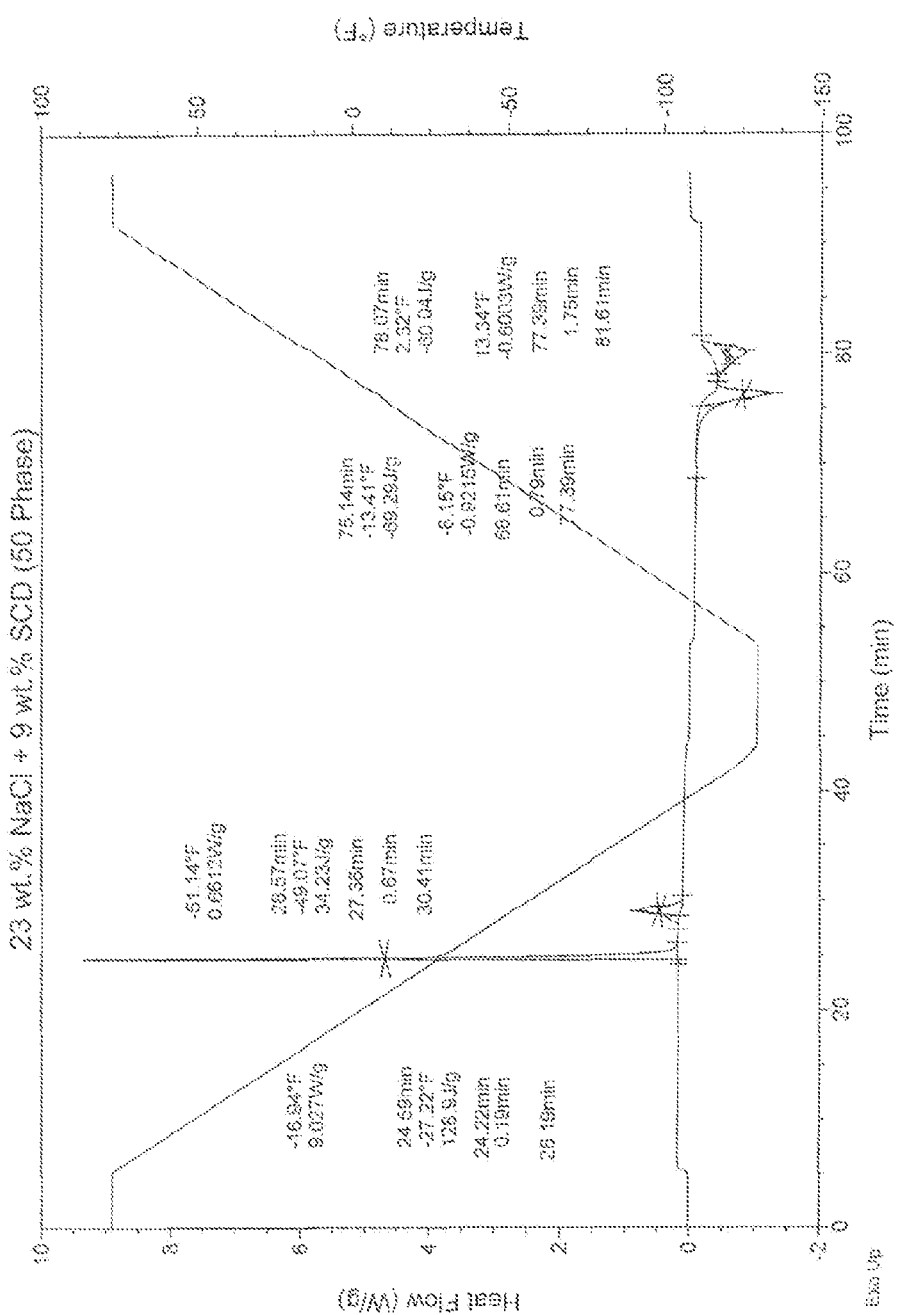

FIG. 6 shows comparative DSC plots for water, a diluted (50 Phase) 23 wt. % NaCl sample, and a diluted (50 Phase) 23 wt. % NaCl+10 wt. % SCD sample across a freezing point transition for the samples. Similar to the undiluted samples, the plots show that a diluted (50 Phase) 23 wt. % NaCl+10 wt. % SCD sample begins to melt faster than a diluted (50 Phase) 23 wt. % NaCl sample without SCD. The plots also show that the time it takes for a diluted (50 Phase) 23 wt. % NaCl+10 wt. % SCD sample to completely melt is less than the time it takes for a diluted (50 Phase) 23 wt. % NaCl sample without SCD to completely melt.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the salt" includes reference to one or more salts and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A deicing composition to reduce an amount of ice formed on a surface, the composition consisting of:
   about 1 wt. % to about 15 wt. % of a salt of citric acid;
   about 23 wt. % to about 28 wt. % sodium chloride when the deicing composition forms an aqueous solution; and
   water.

2. The deicing composition of claim 1, wherein the salt of citric acid is a hydrate of sodium citrate.

3. The deicing composition of claim 2, wherein the hydrate of sodium citrate is sodium citrate dihydrate.

4. The deicing composition of claim 1, wherein the aqueous solution form of the deicing composition has a eutectic point of less than $-6°$ F.

5. The deicing composition of claim 1, wherein the aqueous solution form of the deicing composition has a eutectic point of about $-15°$ F.

6. The deicing composition of claim 1, wherein the deicing composition consists of:
   about 1 wt. % to about 10 wt. % of the salt of citric acid;
   about 23 wt. % to about 28 wt. % sodium chloride when the deicing composition forms an aqueous solution; and
   water.

7. The deicing composition of claim 1, wherein the deicing composition consists of:
   about 1 wt. % to about 7 wt. % of the salt of citric acid;
   about 23 wt. % to about 28 wt. % sodium chloride when the deicing composition forms an aqueous solution; and
   water.

8. The deicing composition of claim 1, wherein the composition has a reduced corrosion rate of about 70% or more compared to an aqueous solution of pure sodium chloride at an equivalent sodium chloride concentration.

* * * * *